(12) United States Patent
Kusuda et al.

(10) Patent No.: US 6,692,360 B2
(45) Date of Patent: *Feb. 17, 2004

(54) GAME SYSTEM, COMMERCIAL GAME APPARATUS, NETWORK GAME APPARATUS, CLIENT DEVICE, AND RECORDING MEDIUM

(75) Inventors: Kazuhiro Kusuda, Tokyo (JP); Hiroshi Tomaru, Tokyo (JP); Yosuke Sasaki, Tokyo (JP)

(73) Assignee: Konami Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/909,890

(22) Filed: Jul. 23, 2001

(65) Prior Publication Data

US 2002/0010023 A1 Jan. 24, 2002

(30) Foreign Application Priority Data

Jul. 21, 2000 (JP) .................................. P. 2000-220656

(51) Int. Cl.[7] .............................................. G06F 17/00
(52) U.S. Cl. .............................................. 463/42; 463/6
(58) Field of Search .............................. 463/42, 40, 41, 463/43, 1, 6, 8, 9, 7, 30, 31, 32; 709/205; 273/148 B, 148 R, 461, 460.1

(56) References Cited

U.S. PATENT DOCUMENTS 6,311,041 B1 * 10/2001 Goodyear .................. 434/247

2002/0013175 A1 * 7/2001 Kusuda ...................... 463/42

FOREIGN PATENT DOCUMENTS

| JP | 63-242293 A | 10/1988 |
| JP | 2-71594 A | 5/1990 |
| JP | 8-829 A | 1/1996 |
| JP | 9-182876 A | 7/1997 |
| JP | 10-276280 A | 10/1998 |
| JP | 11-19337 A | 1/1999 |
| JP | 11-73091 A | 3/1999 |
| JP | 11-168581 A | 6/1999 |
| JP | 2000-176169 A | 6/2000 |
| JP | 2000-508940 A | 7/2000 |

* cited by examiner

*Primary Examiner*—Chen Wen Jiang
(74) *Attorney, Agent, or Firm*—Sughrue Mion, PLLC

(57) ABSTRACT

A game system comprises an the arcade game machine (1) for playing a horse racing simulation game where each player uses a horse he or she trained by themselves, a plurality of player terminals (30) in remote locations, and a Web server (20) connected to the player terminals (30) via the Internet. The Web server manages a horse racing game site on the Internet, where horse races are run in which a number of players can participate by using their own player terminals. The player, after obtaining a password including such data as the performance data of the owned-horse he or she trained in the arcade game machine, accesses the horse racing game site via the player terminal, and can enter his or her owned-horse in the horse races by inputting the password.

32 Claims, 23 Drawing Sheets

FIG. 6A

| ID CODE | |
|---|---|
| PERSONAL INFORMATION | PLAYER'S NAME (HORSE NAME), THE TOTAL NUMBER OF PLAYS, ETC. |
| HORSE INFORMATION | NAME CODE, SEX, HORSE TYPE INFORMATION (GROWTH TYPE), AGE, THE NUMBER OF RACES RUN, SPEED, STAMINA, CONDITION, WINNING PRIZE, RECORD OF THE PAST (FIRST, SECOND, NO PRIZE), TRAINING TYPE |
| FINAL PLAY DATE | |
| UPDATE INFORMATION | |
| CHECK CODE | |

FIG. 6B

| |
|---|
| ID CODE |
| CHECK CODE |
| OTHER INFORMATION (SCREEN LAYOUT INFORMATION, ETC.) |

FIG. 9

DISTINGUISHED HORSE : X X BRYAN

PASSWORD

ABC DEF GHI JKL
MNO PQR STU VWX

With this password, you can take part in "Internet Grand Prix", which is held on the Konami homepage at http://www.konami.co.jp

FIG. 11

> GM RACETRACK

GM racetrack where the strongest horses in the loacal *arcade games* compete with each other at a nationwide level.

Which horse is Japan's No.1?!

> RACE VIEW

You can enjoy a horse race held in the GM racetrack.
Race is held on Fridays at 24:00!

> THIS WEEK'S SCHEDULE PAGE

You can view the races scheduled in this week and the introduction of the running horses.
Five races are held every week!

> LAST WEEK'S RESULTS PAGE

You can view the results of the races held last week.

FIG. 12A

INTERNET GRAND PRIX / OWNER RANKING

| ORDER | OWNER | WINNING PRIZE | RECORD | DISTINGUISHED HORSE | COMMENT |
|---|---|---|---|---|---|
| 1 | Ray | 765 million yen | 15 wins out of 32 races | 8 | four wins toward a championship |
| 2 | Lucky | 680 million yen | 12 wins out of 27 races | 7 | rank up if winning successively |
| 3 | Neo | 646 million yen | 10 wins out of 45 races | 12 | |
| 4 | Simity | 540 million yen | 11 wins out of 26 races | 7 | |
| 5 | Micky | 438 million yen | 8 wins out of 51 races | 13 | |
| 6 | Kinkin | 394 million yen | 7 wins out of 29 races | 8 | |
| 7 | Nice | 360 million yen | 7 wins out of 31 races | 8 | |
| 8 | Blacklist | 349 million yen | 7 wins out of 23 races | 6 | |
| 9 | Mt. Fuji | 321 million yen | 7 wins out of 26 races | 5 | |
| 10 | Green | 309 million yen | 6 wins out of 19 races | 5 | |
| 11 | GM member | 306 million yen | 7 wins out of 18 races | 7 | |
| ... | ... | ... | ... | ... | |
| 30 | Midori | 198 million yen | 3 wins out of 11 races | 6 | |

FIG. 12B

DISTINGUISHED HORSE RANKING (WINNING MONEY) 1ST TO 30TH

| ORDER | HORSE NAME | WINNING MEDAL | LIFETIME RECORD | WINNING RATE | THE NUMBER OF WINS IN GI | GI CHAMPIONSHIP |
|---|---|---|---|---|---|---|
| 1 | Ray Fortune | 8930 | 32 - 15 | .469 | 5 | The Emperor's Prize(spring), Arima Record, Japan Cup |
| 2 | Lucky Silence | 7623 | 27 - 12 | .000 | 5 | Arima Record, Japan Cup |
| 3 | Neo Bryan | 7501 | 45 - 10 | .000 | 4 | Arima Record, Yasuda Record |
| 4 | Simity Prince | 6489 | 26 - 11 | .000 | 5 | The Emperor's Prize(spring), NHK mile, Sprinter S |
| 5 | Ray Prince | 6210 | 51 - 8 | .000 | 3 | Japan Cup |
| 6 | Kinkin Star | 5620 | 51 - 8 | .000 | 4 | Japan Cup, Satsuki Prize, Queen Elizabeth's Prize |
| 7 | Casino Symbol | 5514 | 51 - 8 | .000 | 3 | Derby, Arima Record, Japan Cup |
| 8 | Dragon Palace | 5364 | 51 - 8 | .000 | 3 | Derby, Arima Record, Japan Cup |
| 9 | Mount Thunder | 5147 | 51 - 8 | .000 | 4 | Chrysanthemum Prize, Arima Record |
| 10 | Green Fortune | 5098 | 51 - 8 | .000 | 3 | The Emperor's Prize(spring), Arima Record, Japan Cup |
| 11 | GM Wonder | 5012 | 51 - 8 | .000 | 3 | The Emperor's Prize(spring), Arima Record, Japan Cup |
| ... | ... | ... | ... | ... | ... | ... |
| 30 | Midori Speed | 4150 | 11 - 3 | .273 | 3 | The Emperor's Prize(spring), Arima Record, Japan Cup |

FIG. 12C

DISTINGUISHED HORSE RANKING (RECORD) 1ST TO 30TH

| ORDER | HORSE NAME | RECORD pts. | LIFETIME RECORD | WINNING RATE | THE NUMBER OF WINS IN GI | GI CHAMPIONSHIP |
|---|---|---|---|---|---|---|
| 1 | Muse Raiden | 1147 | 17 - 11 | .647 | 10 | Arima Record, Yasuda Record |
| 2 | Yamazaki Wonder | 1107 | 7 - 6 | .357 | 5 | Arima Record, Japan Cup |
| 3 | Mark Glorious | 978 | 28 - 12 | .428 | 11 | Arima Record, Japan Cup |
| 4 | Asuka Elizabeth | 965 | 13 - 8 | .615 | 7 | The Emperor's Prize(spring), NHK mile, Sprinter S |
| 5 | Hasiru Typhoon | 841 | 23 - 9 | .391 | 9 | The Emperor's Prize(spring), NHK mile, Sprinter S |
| 6 | Side Special | 817 | 30 - 17 | .567 | 5 | Arima Record, Japan Cup |
| 7 | Sun Music | 795 | 11 - 6 | .545 | 5 | Japan Cup, Satsuki Prize, Queen Elizabeth's Prize |
| 8 | Ray Fortune | 719 | 32 - 19 | .469 | 5 | Derby, Arima Record, Japan Cup |
| 9 | Tatsu Silence | 660 | 100 - 11 | .110 | 11 | Derby, Arima Record, Japan Cup |
| 10 | Macho Alpha | 633 | 21 - 7 | .333 | 6 | Derby, Arima Record, Japan Cup |
| 11 | Konami Thunder | 614 | 22 - 8 | .364 | 5 | Chrysnthemum Prize, Arima Record |
| ... | ... | ... | ... | ... | ... | ... |
| 30 | Green Speed | 550 | 10 - 4 | .400 | 3 | The Emperor's Prize(spring), Arima Record, Japan Cup |

RECORD POINT : LIFETIME WINNING RATE × 1000 pts. + THE NUMBER OF WINS IN G1 × 50 pts.

FIG. 13

(a)
To those who wish to enter the Internet Grand Prix

To play this game, you need to raise an outstanding horse in the arcade game machines installed at amusement arceades nationwide, and to obtain a Distinguished Horse password.

If you have a password, you can join the game for free.

(Please note that the password expires three months after yoiu obtained it)

| ENTRY REGISTRATION | If you have already done the owner registration, click here. |
| OWNER REGISTRATION | If you join the game for the first time, click here. |

The next race is held on December 7 (Fri).

(b)
Click the send button after filling out the necessary items.

e-Mail Address for Contact: 123@45678
Owner Name: ○○ (within 8 katakana characters)
PASSWORD: ******* (within 8 half-width alphanumeric characters)

[SEND]

(c)
Confirm the registration information

Owner Name: ○○
PASSWORD: *******

[SEND]

(d)
The registration information has been confirmed.

The record of XX in the Internet Grand Prix
Winning Prize : one billion three hundred and fifty two million yen
The Total Record : 5 wins out of 21 races
Ranking : 23rd / 1289
▼ Championship Race

[Cherry Blossom | Satsuki | The Emperor's Prize (spring) | NHK | Takamatunomiya Record | Oaks | Derby | Yasuda Record | Takarazuka Record | Shuuka Prize | The Emperor's Prize(autumn) | Chrysanthemum | Elizabeth Prize | Mile CS | Japan Cup | Hanshin Three | Asahi | Sprinter | Arima Record]

You have registered seven horses now.    Click here if adding a distinguished horse → [REGISTER DISTINGUISHED HORSE]

XX Bryan    2/7

Performance in the Arcade Game Machine    Lifetime results: 11 wins out of 36 races
GI win: Satsuki Prize, Emperor's Cup(autumn), Japan Cup, Arima Record Performance in the Internet Grand Prix
Results : 1 win out of 3 races    Winning money : fifty five million yen
11/09  Satsuki Prize            5th     two million yen
11/16  Yasuda Record            1st     five million yen
11/30  The Emperor's Prize (spring)  12th    three million yen

[FORWARD]    [RUN] Click if you run the horse.    [NEXT]

(e)
Enter the Distinguished Horse password and click the SEND button.

Distinguished Horse passowrd : [ABC DEF GHI JKL MNO PQR]
[SEND]

(f)
Which race do you want to register in?
(Select one of them.)
○ ○ ○ ○ ○

[Oaks | Derby | Yasuda Record | Takarazuka Record | Shuuka Prize]

The race you can join depends on the number of lifetime winning medals and the G1 championship in the arcade game machine.

[SEND]

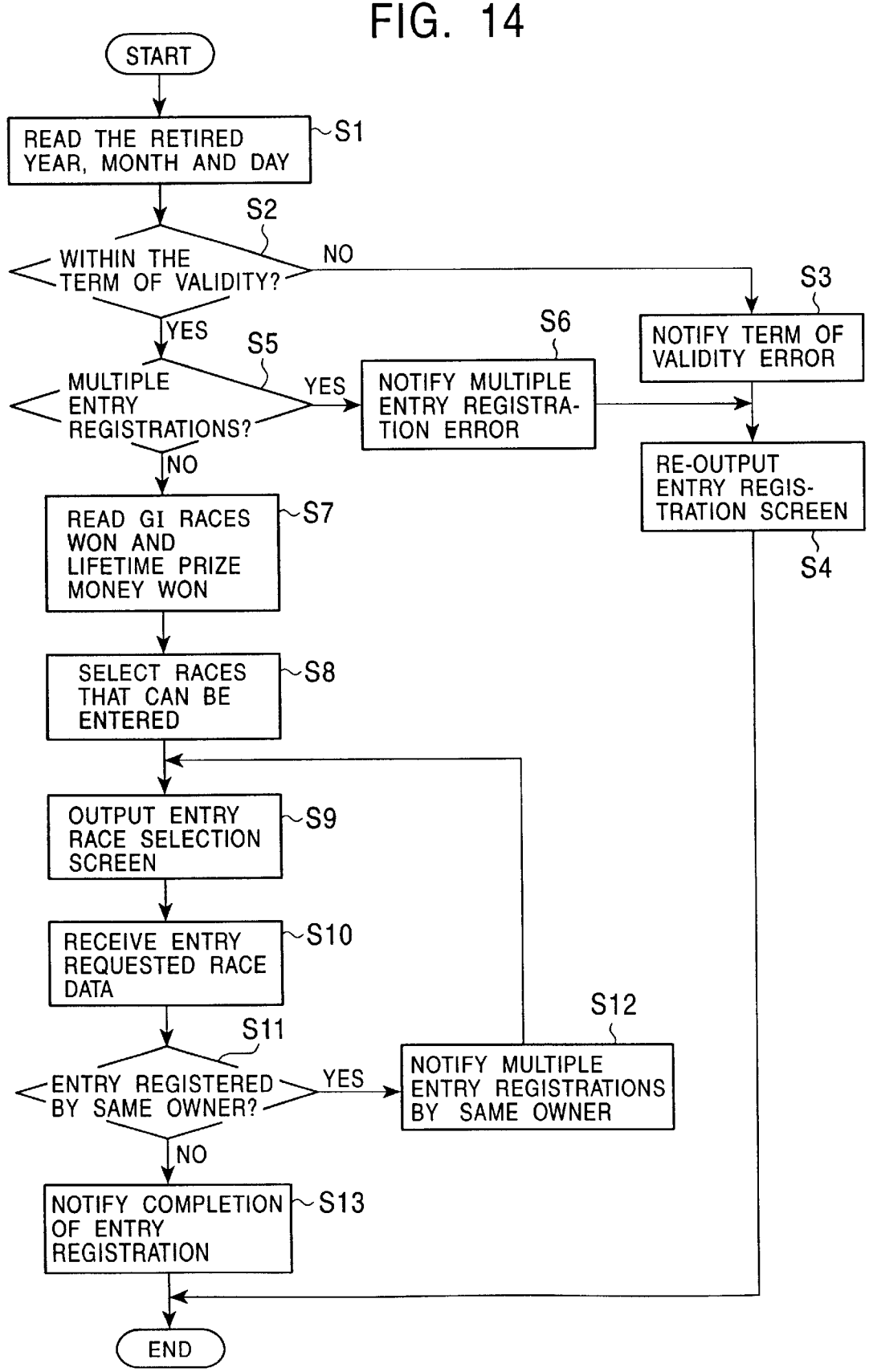

FIG. 16

RACE VIEW    THE NEXT RACE IS SATSUKI PRIZE

SATSUKI PRIZE DECEMBER 7 (FRI) 24:02 START    PRIZE MONEY : FIFTY MILLION YEN

| | HORSE NAME | OWNER | EXPEC-TATION | RECORD | ACHIEVEMENT | | COMMENT | ODDS |
|---|---|---|---|---|---|---|---|---|
| | | | | | WINNING RATE | THE NUMBER OF WINS IN G1 | | |
| 1 | XX Bryan | Kusuda | ○ ◎ | 28-8 | .286 | 7 wins | perfect | 5.6 |
| 2 | Stakoravitch | Tomaru | | 12-7 | .583 | 5 wins | well | 10.5 |
| 3 | XX Prince | Konami | | 17-8 | .471 | 3 wins | slump | 13.5 |
| 4 | Ray Fortune | Ray | ◎◎○ | 8-4 | .500 | 3 wins | the most popular | 4.2 |
| 5 | Lucky Silence | Lucky | | 10-4 | .400 | 2 wins | better condition | 24.9 |
| 6 | Casino Symbol | Ando | × ▲ | 24-12 | .500 | 3 wins | smart running | 35.6 |
| 7 | G1 Classic | Yoshida | △ × | 32-8 | .250 | 5 wins | first challenge | 12.8 |
| 8 | Neo Alpha | Neo | | 28-8 | .286 | 6 wins | former pace down | 86.3 |
| 9 | Simity Typhoon | Simity | | 16-3 | .188 | 3 wins | win a prize | 65.0 |
| 10 | Micky Raiden | Micky | ○ △ | 27-5 | .185 | 7 wins | victory or defeat | 6.9 |
| 11 | Kinkin Special | Kinkin | | 28-8 | .286 | 3 wins | first challenge | 58.3 |
| 12 | Nise Glorious | Nise | | 21-9 | .429 | 2 wins | first challenge | 18.6 |
| 13 | Nomino Heart | Sasaki | | 28-13 | .464 | 5 wins | well | 8.0 |
| 14 | Black Great | Black | ▲ △ △ | 11-5 | .455 | 3 wins | two successive victories | 23.6 |

FIG. 18

LAST WEEK'S RESULTS    DECEMBER 7 (FRI)

DECEMBER 7 (FRI) SECOND RACE    RACE RESULT OF SATSUKI PRIZE

| ORDER | HORSE NUMBER | HORSE NAME | DIFFERENCE | PRIZE MONEY |
|---|---|---|---|---|
| CHAMPIONSHIP | ① | XX Bryan | | 50 MILLION YEN |
| SECOND | ⑬ | Nomino Heart | 5 | 20 MILLION YEN |
| THIRD | ⑩ | Micky Raiden | HEAD | 12.5 MILLION YEN |
| FOURTH | ② | Stakoravitch | NOSE | 7.5 MILLION YEN |
| FIFTH | ⑤ | Lucky Silence | NECK | 5 MILLION YEN |

THE PREVIOUS RACE    THE NEXT RACE

GAME SYSTEM, COMMERCIAL GAME APPARATUS, NETWORK GAME APPARATUS, CLIENT DEVICE, AND RECORDING MEDIUM

BACKGROUND OF THE INVENTION

1. Field of the Invention

The present invention relates to a commercial game apparatus for executing games using a trained object trained by individual players. Further, the present invention relates to a network game apparatus, connected via a network to a plurality of remotely located client devices, and executing network games in which players using the client devices can participate. Further, the present invention relates to a game system comprising the commercial game apparatus and the network game apparatus. Further, the present invention relates to a client device connected via the network to the network game apparatus. Furthermore, the present invention relates to a recording medium, such as a computer readable medium, having recorded a program for controlling a computer included in the network game apparatus.

The present application is based on Japanese Patent Applications Nos. 2000-220656 and 2000-228454, the contents of which are incorporated herein by reference.

2. Description of the Related Art

There are various kinds of commercial game apparatus for running games in which trained objects trained by individual players are used. For example, in a horse racing simulation game, players own horses that they train for themselves and enter in races as the trained objects. In a car racing game, players modify their individual race cars as the trained objects and have them compete in car races. Some of these training-type games allow the players to take part in a game in a group or compete against another player.

In these training-type games, many players wish to have their own trained objects seen by many other players or compete against trained objects owned by many other players. In conventional training-type games, however, the players are generally only allowed to use their trained objects in the commercial game apparatus where they trained the trained objects. As a result, a player with his or her trained object is only able to take part or compete in games against those other players who are playing in the same commercial game apparatus.

In some commercial game apparatus for running horse racing simulation games, a system has been proposed to allow the players to record information on the training results of their horses trained in the particular games on a prearranged card. In this system, the player can record on the card the training result information of his or her horse trained in the particular system provided at a particular store or arcade. The player can take the card to another arcade where the same type of commercial game apparatus is installed, and the player can enter the horse in races there. However, in order for the player to play the game against a number of other players, the players must all visit the same arcade equipped with the particular commercial game apparatus, which is inconvenient for the players. In particular, if a player wants to play against another player who is far away, either one or the other party has to travel the distance between them, thus restricting the playing of games against players living in remote areas.

SUMMARY OF THE INVENTION

In view of the above background, it is an object of the present invention to provide a common ground where greater numbers of players can play the training games using their trained objects. In order to achieve this, the present invention provides a more convenient game system for playing games against players in remote areas, a commercial game apparatus and a network game apparatus for the game system, a client device connected via a network to the network game apparatus, and a recording medium, such as a computer readable medium, having recorded a program for controlling a computer included in the network game apparatus.

To achieve the above-mentioned objects, according to a first aspect of the present invention, there is provided a game system which comprises:

a commercial game apparatus which performs a game in which a trained object, that is trained by each player, is used; and a network game apparatus, which is connected via a network to a plurality of client devices located in remote areas, and which executes a network game in which players using the client devices can participate, wherein the commercial game apparatus comprises:

a trained object information recording medium in which trained object information including training result information about the result of training of the trained object is recorded; and a trained object information output device which outputs at least a part of the trained object information recorded in the trained object information recording medium to the player who has played the game, and wherein the network game apparatus comprises:

a trained object information receiving device which receives the trained object information from the player;

a training result information reading device which reads out, based on the trained object information received by the trained object information receiving device, the training result information about the result of training of the trained object;

a game advancing device which advances the network game based on the training result information as read by the training result information reading device; and a game information distributing device which distributes the game information advanced by the game advancing device to the plurality of client devices via the network.

In this game system, the trained object information of the trained object trained by the player in the commercial game apparatus can be delivered to the network game apparatus for playing the network game, in which a number of players in remote areas can participate via the network. The network connecting the client device used by the players and the network game is not limited to such a global network as the Internet. Thus, the network may include a closed network to which only a limited number of persons have access, or a network laid out within a limited space such as a game arcade. The trained object information includes parameters unique to each trained object and relevant to the proceeding of the game, such as the name of the trained object, and personal information on the player, as well as information concerning the result of training, i.e. the training result information. Apart or all of the trained object information recorded on the trained object information recording medium is output from the commercial game apparatus to the player via the trained object information output device. The trained object information output may, for example, display a password including the trained object information on the screen of the commercial game apparatus, or record the trained object information on a portable recording medium such as a floppy disc (FD) in the form of electronic data. The thus output trained object information is delivered by the player to the network game apparatus via the trained object information receiving device. Based on the received trained object information, the network game apparatus reads the training result information of the trained object by way of the training result information reading device. The training result information reading device reads the training result information from the received trained object information if it contains one. If, however, the received trained object information does not contain the training result information, the training result information reading device reads the training result information associated with the trained object information from other locations such as a database where the training result information is recorded. The thus read training result information affects the advancement of the network game for the trained object. Game information including visual and sound components of the network game are delivered to the multiple client device via the network, thereby enabling the players to play the network game using their client device.

In this game system, the training result information read by the network game apparatus is used as parameters unique to the trained object used in the network game, so that each player can reflect the training result of the trained object in the commercial game apparatus in the network game. Furthermore, a number of players using the multiple client device at remote locations can participate, via the network such as the Internet, in the network game being run on the network game apparatus comprising the game system. Accordingly, the players, by using the client device, can play the game against many other players at remote locations using their own trained objects trained individually in the commercial game apparatus.

According to second to twelfth aspects of the present invention, there is provided a commercial game apparatus, which performs a game in which a trained object that is trained by each player is used, and is used in a game system including a network game apparatus which is connected via a network to a plurality of client devices located in remote areas and which executes a network game in which players using the client devices can participate. The commercial game apparatus comprises:

a trained object information recording medium in which trained object information including training result information about the result of training of the trained object is recorded; and a trained object information output device which outputs at least a part of the trained object information recorded in the trained object information recording medium to the player who has played the game.

These commercial game apparatus are adapted for use in the game system according to the first aspect of the present invention, such that the player who trained the trained object in the commercial game apparatus can play games against other players at remote locations on the network by using the trained object.

According to a third aspect of the present invention based on the commercial game apparatus of the second aspect, it is preferable that the trained object information output by the trained object information output de-vice includes identifying information for identifying the trained object that the player trained, wherein the commercial game apparatus further comprising a training result information output device for outputting the training result information associated with the identifying information.

If the training result information of the trained object trained by the player contains detailed parameters, the amount of information of the training result information will be great. When the trained object information output device outputs the trained object information containing the training result information, and if the trained object information is to be displayed by a password, the player will have to write down the password, which would be long. If the password is to be recorded on a predetermined portable recording medium, too, a large-capacity recording medium will be necessary, which would be a financial burden to the player. Accordingly, in the commercial game apparatus according to the third aspect of the present invention, the trained object information output to the player contains at least the identifying information for identifying the trained object trained by the player, and the training result information associated with the identifying information is output by the training result information output device, separately from the trained object information. The training result information output device may, for example, transmit the training result information to the network game apparatus via the network, or record the training result information on a predetermined portable recording medium. If the training result information output device records on a portable recording medium, the player will be able to carry the portable recording medium and transfer the recorded contents of the portable recording medium to the network game apparatus. By thus delivering the training result information to the network game apparatus without inconveniencing the player, the player needs to receive only the trained object information. Thus, the training result information, even if the amount of information is great, can be reflected in the network game without putting a burden on the player.

According to a fourth aspect of the present invention based on the commercial game apparatus of the second aspect, it is preferable that the trained object information output by the trained object information output device includes the training result information.

In this commercial game apparatus, since the trained object information output from the trained object information output device contains the training result information, the player only needs the trained object information to participate in the network game using the trained object. Accordingly, in contrast to the commercial game apparatus according to the third aspect of the present invention, there is no need to provide the arrangement for delivering the training result information in the commercial game apparatus to the network game apparatus separately from the trained object information.

According to a fifth aspect of the present invention based on the commercial game apparatus of the third or fourth aspect, it is preferable that the training result information is training result information of an optimum condition from among the training result information recorded in the trained object information recording medium.

In some training type games, the trained object improves in its abilities, which are used as the training result information as the game advances, while in some others such abilities deteriorate during the course of the game. For example, in some training-type horse racing simulation games, the horse's potential, after reaching a peak, is preset to gradually deteriorate as the horse gets older. In this type of commercial game apparatus, where the trained object's potential drops during the course of the game, if the training result information remains as it was when the trained object information was output, the player may not be able to use the trained object he or she trained at its optimal state in the network game, thus detracting from the enjoyment. Therefore, in the commercial game apparatus according to the fifth aspect of the present invention, the training result information as output is that of an optimal state of all the states that the trained object training in the commercial game apparatus had. As a result, the player can reflect the training result information in its optimal state in the network game.

According to a sixth aspect of the present invention based on the commercial game apparatus as defined in any one of the second to fifth aspects, it is preferable that the trained object information output device includes a password output device which outputs a password that includes the trained object information converted into a character sequence.

This commercial game apparatus uses the password output device as the trained object information output device in order to output a password containing the trained object information in the form of a character sequence. The password output device may display the password on the display of the commercial game apparatus, print it out on a paper medium and the like, or write the password in the form of electronic data such as text data on a portable recording medium. Once the thus output password is delivered to the player, the player, for example, can transmit the password from the client device such as a personal computer to the network game apparatus connected via the network to the client device.

According to a seventh aspect of the present invention based on the commercial game apparatus of the sixth aspect, it is preferable that the password includes a check code associated with the information included in the password.

In this commercial game apparatus, the check word associated with the information contained in the password is contained in the password. The check code may be a character sequence representing the result of calculating code data indicating the information contained in the password according to a predetermined calculation formula. By thus having the password contain the check code, it becomes possible to prevent a player who does not own the password from fabricating his or her own password and using it illegally.

According to an eighth aspect of the present invention based on the commercial game apparatus according to any one of the second to seventh aspects, it is preferable that the trained object information output by the trained object information output device includes apparatus information for identifying the commercial game apparatus.

In this commercial game apparatus, the trained object information output device outputs the trained object information which contains the apparatus information for identifying the particular commercial game apparatus. By using the apparatus information, it becomes possible to identify the location of the commercial game apparatus in which the trained object concerning the trained object information was trained. This makes it possible, for example, to limit the players who can participate in local preliminaries based on the apparatus information when such preliminaries are held for nationwide competitions of network games, or to collect statistics on the number of participants in network games on a regional basis.

According to a ninth aspect of the present invention based on the commercial game apparatus as defined in anyone of the second to eighth aspects, it is preferable that the trained object information output by the trained object information output device includes date information for identifying the date on which the trained object information is output by the trained object information output device.

In this commercial game apparatus, the trained object information output device outputs the trained object information containing the date information for identifying the date on which the trained object information was output. As a result, it becomes possible to determine a deadline by which players can enter in a network game with the trained object concerning the particular trained object information. By thus establishing a deadline, in the event that a player with a trained object whose deadline has expired wants to enter in the network game once again, the player must play in the particular commercial game apparatus again. Thus, this invention can provide an incentive for the player to play in the particular commercial game apparatus again.

According to a tenth aspect of the present invention based on the commercial game apparatus as defined in anyone of the second to seventh aspects, it is preferable that the trained object information output by the trained object information output device includes apparatus information for identifying the commercial game apparatus and serial number information for identifying the serial number of the trained object information output by the trained object information output device.

In the event that different players have trained identical trained objects, these players may output identical trained object information. In particular, when the trained object information is output by way of a simple password, the amount of information is limited and, for this reason, it is highly possible that the same password will be output to those different players. To counter this problem, in the commercial game apparatus according to the tenth aspect of the present invention, the trained object information output from the trained object information output device contains serial-number information as well as the apparatus information. Based on the apparatus information, it can be identified in which commercial game apparatus the trained object concerning the trained object information was trained. Further, based on the serial-number information, it becomes possible to identify the serial numbers of the trained object information that were output from the particular commercial game apparatus in the past. Accordingly, the output of identical trained object information between different players can be prevented even if their trained objects are identical.

According to an eleventh aspect of the present invention based on the commercial game apparatus according to any one of the second to seventh aspects, it is preferable that the trained object information output by the trained object information output device includes apparatus information for identifying the commercial game apparatus, date information for identifying the date on which the trained object information is output by the trained object information output device, and date-specific order information for identifying the order of the trained object information output by the trained object information output device on a particular day.

In this commercial game apparatus, the trained object information output device outputs the trained object information that includes the apparatus information, date information and date-specific order information. Based on the apparatus information, it can be identified by which commercial game apparatus the trained object associated with the trained object information was trained. Based on the date information, the date on which the commercial game apparatus output the trained object information can be identified. And based on the date-specific order information, the order in which the trained object information was output by the commercial game apparatus on the identified date can be determined. Accordingly, as in the tenth aspect of the present invention, the output of identical trained object information from different players can be prevented even if the players have trained identical trained objects.

According to a twelfth aspect of the present invention based on the commercial game apparatus according to any one of the second to eleventh aspects, it is preferable that the trained object information output by the trained object information output device includes acquisition information acquired by the trained object during the game.

In this commercial game apparatus, the trained object information output device outputs the trained object information that includes the acquisition information which the trained object acquired in the commercial game apparatus. This enables the acquisition information to be used in the network games. The contents of the acquisition information vary depending on the contents of the game played in the commercial game apparatus. In the case of the racehorse training simulation game, they include the prize money won, and the title of the race won, for example. In the case of the medal game, the acquisition information may include the number of medals won. Thus, the acquisition information such as the title of the race won can be utilized in a network game for which an experience of having won a specific race is a condition for entry.

According to thirteenth to twenty sixth aspects of the present invention, there is provided a network game apparatus, which is connected via a network to a plurality of client devices located in remote areas, and which executes a network game in which players using the client devices can participate, wherein the network game apparatus is used in a game system including a commercial game apparatus which performs a game in which a trained object that is trained by each player is used. The network game apparatus comprises:

a trained object information receiving device which receives trained object information about a trained object trained in the commercial game apparatus;

a training result information reading device which reads out the training result information about the result of training of the trained object based on the trained object information received by the trained object information receiving device;

a game advancing device which advances the network game based on the training result information read by the training result information reading device; and a game information distributing device which distributes game information advanced by the game advancing device to the plurality of client devices via the network.

By using this network game apparatus in the game system according to the first aspect of the present invention, a number of remote players can participate in a network game via the network by using the trained object information of the trained objects that were trained in the commercial game apparatus where the training game is played.

According to a fourteenth aspect of the present invention based on the network game apparatus of the thirteenth aspect, it is preferable that the trained object information includes identifying information for identifying the trained object trained by the player, wherein the network game apparatus further comprises:

a training result information receiving device which receives training result information, which is information concerning the result of training of the trained object associated with the identifying information;

a training result information recording medium in which the training result information is recorded; and a training result information recording device which records the training result information received by the training result information receiving device in the training result information recording medium, wherein the training result information reading device reads out the training result information recorded in the training result information recording medium, based on the identifying information included in the trained object information received by the trained object information receiving device.

In this network game apparatus, the training result information receiving device receives the training result information as output from the training result information output device of the commercial game apparatus according to the third aspect of the present invention. The received training result information is recorded in the training result information recording medium by the training result information recording device. As the trained object information receiving device receives the identifying information contained in the trained object information output from the trained object information output device of the commercial game apparatus, the training result information associated with the identifying information is read from the training result information recording medium by the training result information reading device, so that the game can be advanced on the basis of the training result information. By such an arrangement, the training result information can be reflected onto the network game without inconveniencing the player, even if the training result information has a large information content.

According to a fifteenth aspect of the present invention based on the network game apparatus of the thirteenth aspect, it is preferable that the trained object information includes training result information, which is information concerning the result of training of the trained object, wherein the network game apparatus further comprises:

a training result information recording medium in which the training result information is recorded; and a training result information recording device which records the training result information included in the trained object information received by the trained object information receiving device in the training result information recording medium, wherein the training result information reading device reads out the training result information recorded in the training result information recording medium.

In this network game apparatus, the trained object information receiving device receives the trained object information from the commercial game apparatus according to the fourth aspect of the present invention, and the training result information in the training result information included in the trained object information is recorded by the training result information recording device onto the training result information recording medium. The training result information is thereafter read from the training result information recording medium by the training result information reading device, and the game is advanced on the basis of the thus read training result information. In the network game apparatus according to the fourteenth aspect of the present invention, it is necessary that there be provided an arrangement for receiving the training result information from the commercial game apparatus separately from the trained object information; no such arrangement is required in the network game apparatus according to the fifteenth aspect of the present invention.

According to a sixteenth aspect of the present invention based on the network game apparatus according to any one of the thirteenth to fifteenth aspects, it is preferable that the training result information is training result information of an optimum state in the commercial game apparatus.

In this network game apparatus, the network game can be executed by using the optimum state of the commercial game apparatus. In this network game apparatus, if the training result information is received from the commercial game apparatus according to the fifth aspect of the present invention, the training result information, which is of the optimum state, can be utilized as is. On the other hand, in the case where the training result information is received from a commercial game apparatus other than that according to the fifth aspect of the present invention, the training result information of the optimum state can be read from that training result information if it includes past training result information (history information), and the network game can be played by using the optimum-state training result information.

According to a seventeenth aspect of the present invention based on the network game apparatus according to any one of the thirteenth to sixteenth aspects, it is preferable that the trained object information receiving device includes a password receiving device which receives a password including the trained object information converted into a character sequence, and wherein the network game apparatus further comprises a password deciphering device which deciphers the password received by the password receiving device and obtaining the trained object information included in the password.

In this network game apparatus, the trained object information receiving device receives the password output by the commercial game apparatus according to the sixth aspect of the present invention, and the password is deciphered by the password deciphering device to obtain the trained object information.

According to an eighteenth aspect of the present invention based on the network game apparatus according to the seventeenth aspect, it is preferable that the password includes a check code associated with the information included in the password, wherein the network game apparatus further comprises a password assessing device which determines whether or not the information included in the password is valid based on the check code obtained by the deciphering in the password deciphering device.

In this network game apparatus, based on the check code contained in the password output from the commercial game apparatus according to the seventh aspect of the present invention, it is determined whether the information contained in the password is valid or not. For example, when the check code is a character sequence converted from the result of arithmetically operating a code data indicating the information contained in the password according to a predetermined formula, the assessment can be made by comparing the code obtained by operating the formula backwards with the code data of the corresponding respective information. Thus, by assessing whether or not the password information is valid, illicit use of the password can be prevented, such as by those players without a password who try to participate in the network game by fabricating a password.

According to a nineteenth aspect of the present invention based on the network game apparatus according to the thirteenth to eighteenth aspects, it is preferable that the network game apparatus further comprises:

an entry application receiving device which receives a entry application indicating a request to participate in the network game as a player; and an entry decision device which makes a decision to allow entry in the network game based on the entry application if a certain entry condition is met.

In this network game apparatus, the entry application receiving device receives an entry application from a player, and the entry decision device makes a decision to accept entry by the player with the training result information about his or her trained object if a predetermined entry condition is met. The entry conditions vary depending on the contents of the game or the purpose of entry regulation. They may include, for example, the number of participants sought, the number of games played in the commercial game apparatus, and the trained object's performance based on its training result information.

According to a twentieth aspect of the present invention based on the network game apparatus according to the nineteenth aspect, it is preferable that the trained object information includes apparatus information for identifying the commercial game machine where the trained object concerning the trained object information is trained, wherein the entry decision device makes a decision to allow entry in the network game based on the entry application if the entry condition is met, the condition stipulating that the apparatus information included in the trained object information received by the trained object information receiving device has predetermined apparatus information.

In this network game apparatus, a decision to allow entry by a player with the training result information of the player's trained object is made if the apparatus information included in the trained object information matches the predetermined apparatus information required as the predetermined entry condition In other words, the decision for entry is made if the certain apparatus information is included in the received trained object information. Accordingly, it becomes possible to carry out a network game in which only those trained objects that were trained in the commercial game apparatus installed in a particular area participate.

According to a twenty first aspect of the present invention based on the network game apparatus according to the nineteenth or twentieth aspect, it is preferable that the trained object information includes date information for identifying the date on which the trained object information is output by the commercial game apparatus where the trained object is trained, wherein the entry decision device makes a decision to allow entry based on the entry application if the entry condition is satisfied, the condition stipulating that the date information included in the trained object information received by the trained object information receiving device has predetermined date information.

In this network game apparatus, a decision to allow entry by the player with the training result information of his or her trained object is made if the date information included in the trained object information matches the predetermined date information required as the predetermined entry condition. In other words, the decision for entry is made if the received trained object information includes the date information within a specific range. This makes it possible, for example, to set a term of validity for entry in a game with the trained object associated with the trained object information, and then to reject entry by those trained objects exceeding the term of validity. Thus, the players can be motivated to play in the commercial game apparatus again.

According to a twenty second aspect of the present invention based on the network game apparatus according to any one of the nineteenth to twenty first aspects, it is preferable that the entry decision device makes a decision to allow entry in the network game based on the entry application if the entry condition is satisfied, the condition stipulating that the trained object concerning the trained object information received by the trained object information receiving device is not identical to another trained object already entered in the network game.

In this network game apparatus, entry in the game can be rejected if the trained object information associated with the entry application is identical to any of the other trained objects already taking part in the game to which the application was made. Accordingly, multiple or redundant entry of identical trained objects in the same game can be prevented.

According to a twenty third aspect of the present invention based on the network game apparatus according to any one of the nineteenth to twenty second aspects, it is preferable that the entry decision device makes a decision to allow entry in the network game based on the entry application if the entry condition is satisfied, the condition stipulating that the player concerning the entry application received by the entry application receiving device is not identical to another player already entered in the network game.

In this network game apparatus, if the player who made the entry application is identical to any of the other players already taking part in the game, his or her entry can be rejected. Thus, redundant entry of the same player in the same game can be prevented. Furthermore, this helps to prevent the possibility of such illicit conduct as one player playing the game all by himself to obtain a privilege designed to be granted to the winner of the game.

According to a twenty fourth aspect of the present invention based on the network game apparatus according to any one of the thirteenth to twenty third aspects, it is preferable that the trained object information includes acquisition information acquired during the game in the commercial game apparatus by the trained object, wherein the game advancing device utilizes the acquisition information in the network game.

In this network game, the acquisition information acquired in the commercial game apparatus can be used in the network game executed by the network game apparatus. The acquisition information can be used in various ways, depending on the contents of the network game. For example, in the case where both the network game and the game in the commercial game apparatus are a horse racing simulation game, the acquisition information acquired in the commercial game apparatus, including the prize money acquired and the number of medals acquired, may be used as parameters to raise the performance of the trained object in the network game.

According to a twenty fifth aspect of the present invention based on the network game apparatus according to any one of the thirteenth to twenty fourth aspects, it is preferable that the game advancing device includes a training device which trains a trained object unique to a player who has entered in the network game, and an initial training result information determining device which determines initial training result information for the trained object to be used in the network game prior to its training, based on the training result information based on the trained object information received by the trained object information receiving device.

In this network game apparatus, the initial training result information determination device determines; the initial training result information of the trained object for use in the network game based on the training result information in the commercial game apparatus, and the training-type game can be executed where the trained object is trained by the training device. In this arrangement, those trained objects that have come to possess higher performance than other players' as a result of training in the commercial game apparatus can be given higher initial training result information than other players, for example, based on the training result information, there by differentiating the individual trained objects. It should be noted, however, that the network game apparatus according to any one of the thirteenth to twenty fourth aspects of the present invention does not necessarily have to be the training-type game.

According to a twenty sixth aspect of the present invention based on the network game apparatus according to any one of the thirteenth to twenty fifth aspects, it is preferable that the network game apparatus further comprises a privilege granting device which grants a privilege to a trained object that satisfies the certain condition or to a player who has trained such a trained object in the network game.

In this network game apparatus, those trained objects or those players who have trained them that have met the certain conditions in the network game are granted a privilege by the privilege granting device. The certain conditions and the contents of the privilege vary depending on the contents of the game, for example. They may include, for example, the giving of a certificate of commendation or a trophy to the player who won a particular race, or the opportunity for the trained object that has achieved a course record to have the color of the horse made different from other horses.

According to a twenty seventh aspect of the present invention., there is provided a client device connected via a network to a network game apparatus which executes a network game in which players using the client devices can participate, wherein the network game apparatus is used in a game system including a commercial game apparatus which performs a game in which a trained object that is trained by each player is used, the network game apparatus comprises a trained object information receiving device which receives trained object information about a trained object trained in the commercial game apparatus, a training result information reading device which reads out the training result information about the result of training of the trained object based on the trained object information received by the trained object information receiving device, a game advancing device which advances the network game based on the training result information read by the training result information reading device, and a game information distributing device which distributes game information advanced by the game advancing device to the plurality of client devices via the network. Preferably, the client device comprises:

a trained object information input device which inputs trained object information, which is information concerning a trained object trained in the commercial game apparatus;

a trained object information output device which outputs the trained object information input by the trained object information input device to the network game apparatus via the network;

a game information receiving device which receives the game information distributed by the game information distributing device of the network game apparatus; and a game information providing device which provides the players with the game information received by the game information receiving device.

This client device is connected via the network to the network game apparatus according to any one of the thirteenth to twenty sixth aspects of the present invention. As the player, for example, inputs via the trained object information input device the trained object information about the trained object that was trained in the commercial game apparatus, the trained object information is output to the network game apparatus by the trained object information output device. As the game proceeds based on the trained object information, the game information is received by the game information receiving device, and the game information providing device provides the player with the game screen, audio and the like.

According to a twenty eighth aspect of the present invention, there is provided a computer readable medium having recorded a program for operating a computer included in a network game apparatus which is connected via a network to a plurality of client devices located in remote areas and which executes a network game in which players using the client devices can participate, wherein the network game apparatus is used in a game system including a commercial game apparatus which performs a game in which a trained object that is trained by each player is used, the network game apparatus comprises a trained object information receiving device which receives trained object information about a trained object trained in the commercial game apparatus, a training result information reading device which reads out the training result information about the result of training of the trained object based on the trained object information received by the trained object information receiving device, a game advancing device which advances the network game based on the training result information read by the training result information reading device, and a game information distributing device which distributes game information advanced by the game advancing device to the plurality of client devices via the network. Preferably, the program comprises:

- a training result information reading routine for reading out the training result information, which is information concerning the result of training the trained object, based on the trained object information received by the trained object information receiving device that receives the trained object information, which is information concerning the trained object trained in the commercial game apparatus;
- a game advancing routine for advancing the network game based on the training result information read in the training result information reading routine; and
- a game information distributing routine for distributing game information advanced by the game advancing routine to the plurality of client devices via the network.

The program recorded in the recording medium is run on the computer comprising the network game apparatus according to any one of the thirteenth to twenty sixth aspects of the present invention, thereby providing a network game in which a number of players residing at remote locations can participate by utilizing the trained object information of the trained object trained in the commercial game apparatus where the training-type game is executed.

BRIEF DESCRIPTION OF THE DRAWINGS

The above and other objects and advantages of the present invention will become more apparent by describing in detail preferred embodiments thereof with reference to the accompanying drawings, wherein:

FIG. 6A is a drawing for the explanation of data structure of player data;

FIG. 6B is a drawing for the explanation of the data structure of the written data written in the magnetic card;

FIG. 9 is a schematic illustration of a password screen displayed on a display of the arcade game machine of FIG. 3;

FIG. 11 is a schematic illustration of the racecourse page of the horse racing game site;

FIGS. 12A to C shows ranking tables disclosed on the ranking page of the horse racing game site;

FIG. 13(*a*) is a schematic illustration of an initial screen on an entry registration page of the horse racing game site;

FIG. 13(*b*) is a schematic illustration of an owner registration screen of the entry registration page;

FIG. 13(*c*) is a schematic illustration of a registration confirmation screen of the entry registration page;

FIG. 13(*d*) is a schematic illustration of an entry registration screen of the entry registration page;

FIG. 13(*e*) is a schematic illustration of an owned-horse password input screen of the entry registration screen;

FIG. 13(*f*) is a schematic illustration of an entry race selection screen of the entry registration screen;

FIG. 14 shows a flowchart of a control operation by a control unit running a entry decision program in a Web server;

FIG. 16 is a schematic illustration of a race information screen displayed on a race watching page of the horse racing game site prior to the start of a race;

FIG. 18 is a schematic illustration of a race result display screen displayed on the race watching page at the end of the race;

DETAILED DESCRIPTION OF THE PREFERRED EMBODIMENTS

1. First Embodiment

Hereinafter, an embodiment (hereinafter referred to as a first embodiment) of the present invention will be described providing a game system in which a player trains a horse as the trained object in a commercial game apparatus (hereinafter referred to as an arcade game machine) where a training-type horse racing simulation game is played, and in which the player can enter the horse in an Internet horse racing game (hereinafter referred to as an Internet Grand Prix), which is a network game on a public horse racing game site on the Internet.

First, the overall structure of the game system according to the first embodiment will be described.

Figure 2:
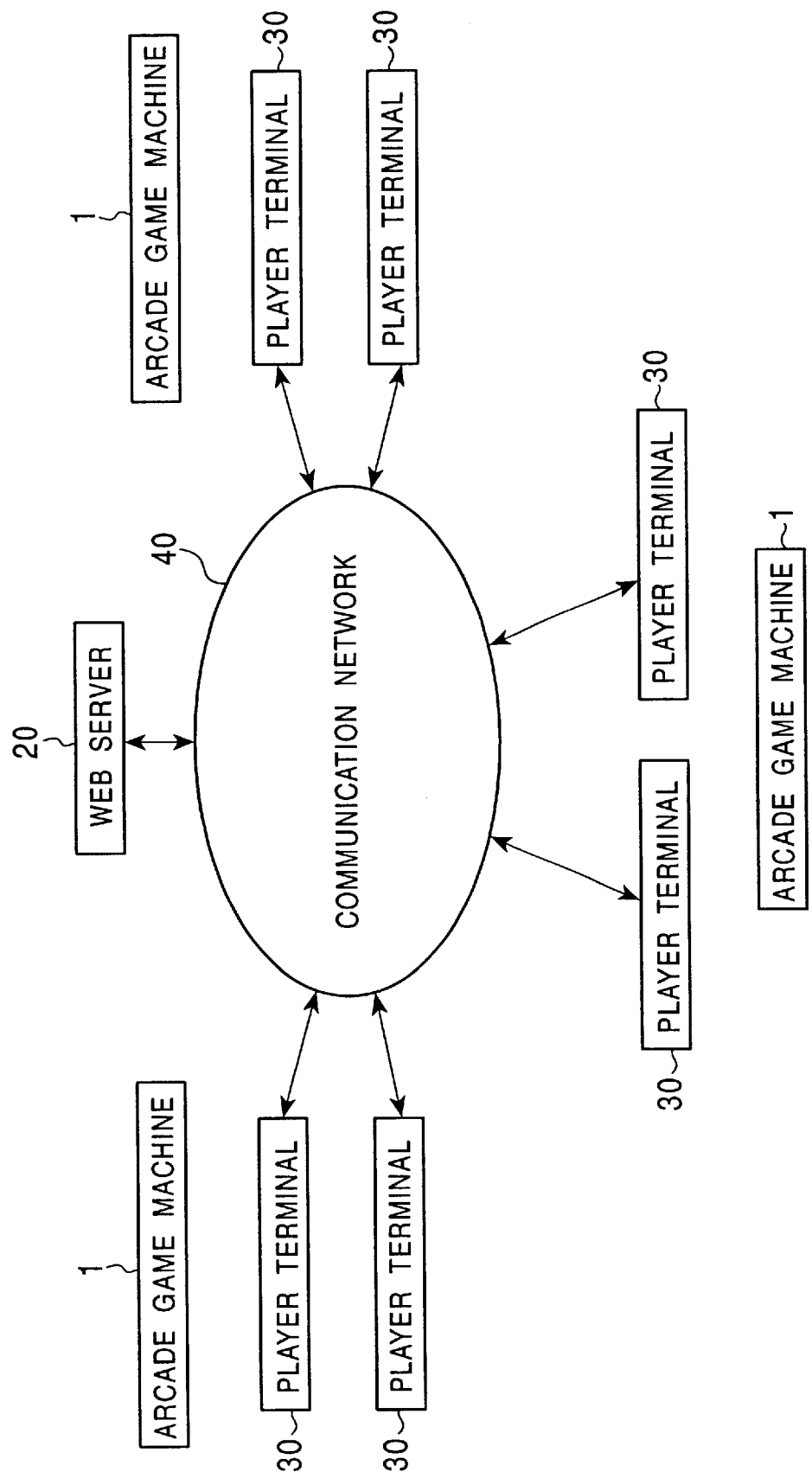
FIG. 2 is a diagram showing the overall structure of the game system according to the first embodiment.

FIG. 2 schematically shows the overall structure of the game system according to the first embodiment. The game system comprises a plurality of arcade game machines 1 installed at game arcades nationwide, for example, a the Web server 20 as a network game apparatus for managing and operating the horse racing game site and running the Internet Grand Prix held on the site, and player terminals 30 which are individual client device which can be connected to the Internet. The player terminals 30 can be connected to the Web server 20 via a the network 40 such as a public telephone line network, dedicated telephone line, cable television line, or radio communication line, for example. The player terminals 30 can therefore gain access to the horse racing game site open for access on the Internet by using a predetermined browser via the Web server 20. Various data are transferred between the Web server 20 and the player terminals 30 in the form of computer data signals embodied in predetermined carrier waves via the communication network 40 which acts as a transfer medium.

2. Structure of Arcade Game Machine 1

Figure 3:
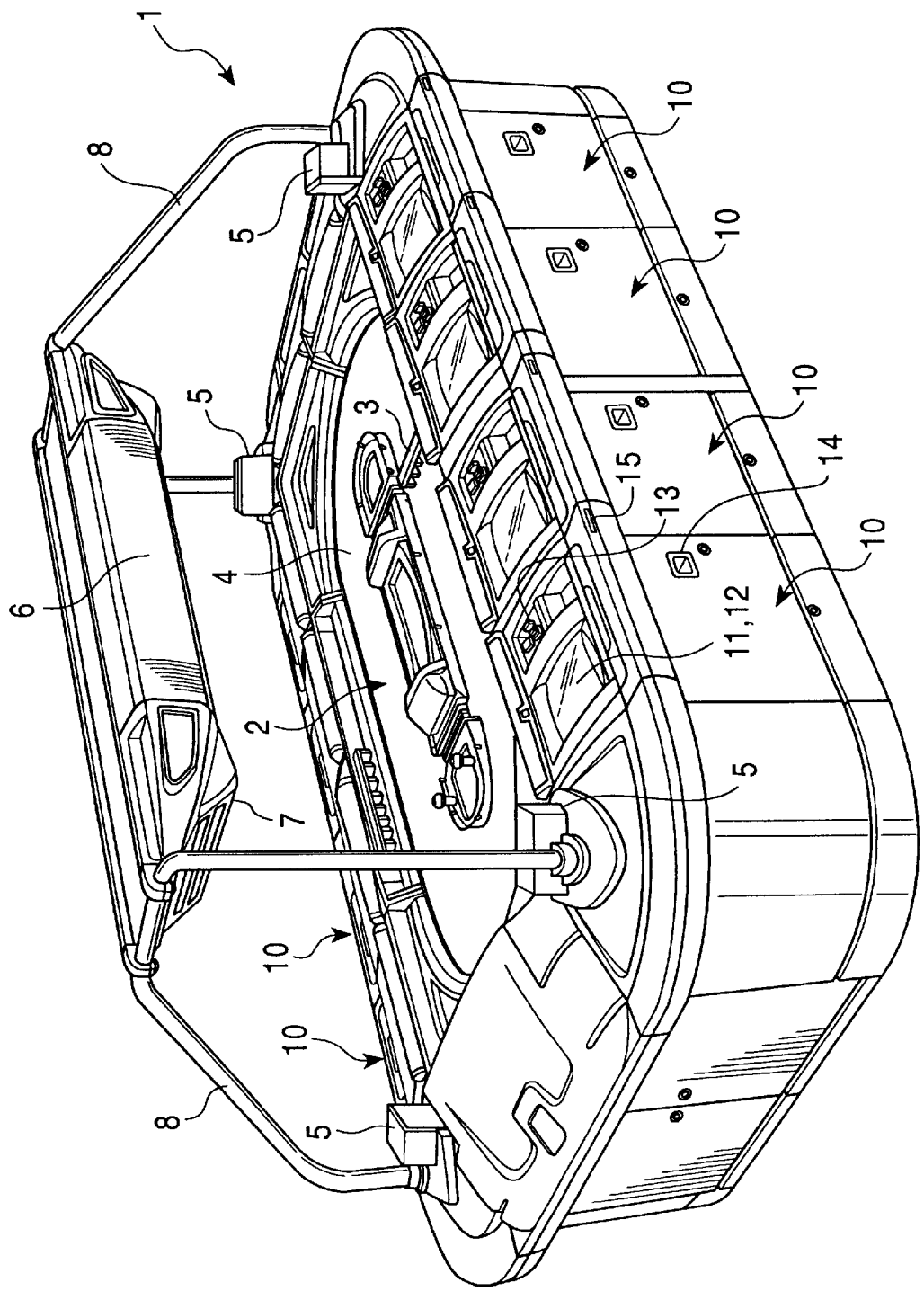
FIG. 3 is an external perspective view of an example of an arcade game machine serving as a part of the game system according to the first embodiment.

FIG. 3 shows an external perspective view of an example of an arcade game machine 1. The arcade game machine 1 comprises a field 2 mounted at the center and a plurality of stations 10 mounted in such a manner as to surround the field 2. The field 2 is provided with a the race course 4 with a starting gate 3, in which the race course 4 is a venue where a plurality of model horses, which is not shown, run and compete in a race. Around the field 2 is mounted a plurality of the speakers 5 for supplying an on-the-spot broadcast and cheers from the crowd. Above the field 2 is mounted a display unit 6 for displaying the title of the game, for example, and an illuminating device 7 for illuminating the field 2. The display unit 6 and the illuminating device 7 are supported by a support column 8.

The plurality of stations 10 is each equipped with a display 11 for displaying a game screen to follow the progress of the game and a touch panel 12 superimposed on the display screen of the display 11. As the player touches a predetermined location on the game screen displayed on the display 11 in accordance with the instructions on the game screen, the touch panel 12 detects the location and operation of the player recognized by the arcade game machine 1. Each individual station 10 is further equipped with a medal inlet 13 where medals are to be inserted by the player, a medal outlet 14 from which medals are dispensed to the player, and a magnetic card insertion slot 15 for inserting a magnetic card as a portable recording medium that allows the carrying of the trained object information.

In the arcade game machine 1, races with the same titles as the actual races organized by the Japan Racing Association are successively conducted according to a predetermined cycle. About 60 races are prepared for a one-year period of time, and each race is allotted a time interval for betting of the medals, or the purchase of betting tickets, so to speak, a time interval for the actual race run by the model horses, and a time interval for indicating the race results. Each player can predict the finishing order for each race and freely purchase the betting tickets. The purchase of the tickets is substituted by the betting of the medals. If the purchased ticket agrees with the race result, a number of medals corresponding to the number of medals bet and the odds are paid back as a dividend.

In the arcade game machine 1, players can also participate in the game as horse owners. In this case, the player can select a horse of his liking from among a plurality of prearranged racehorses, and purchase the horse by paying a predetermined number of medals. The name of the horse is produced by combining a name selected from names previously recorded in the arcade game machine with a player name (such as the player's full name) as input by the player. The player can then train the purchased horse so as to increase its performance. He can also enter his horse in a desired race. It should be noted that the arcade game machine 1 supplies magnetic cards to the players so that they can resume the game on another day from where they left, thus ensuring that the continuity of the game is not affected for those players who participate in the game as the horse owners.

Figure 4:
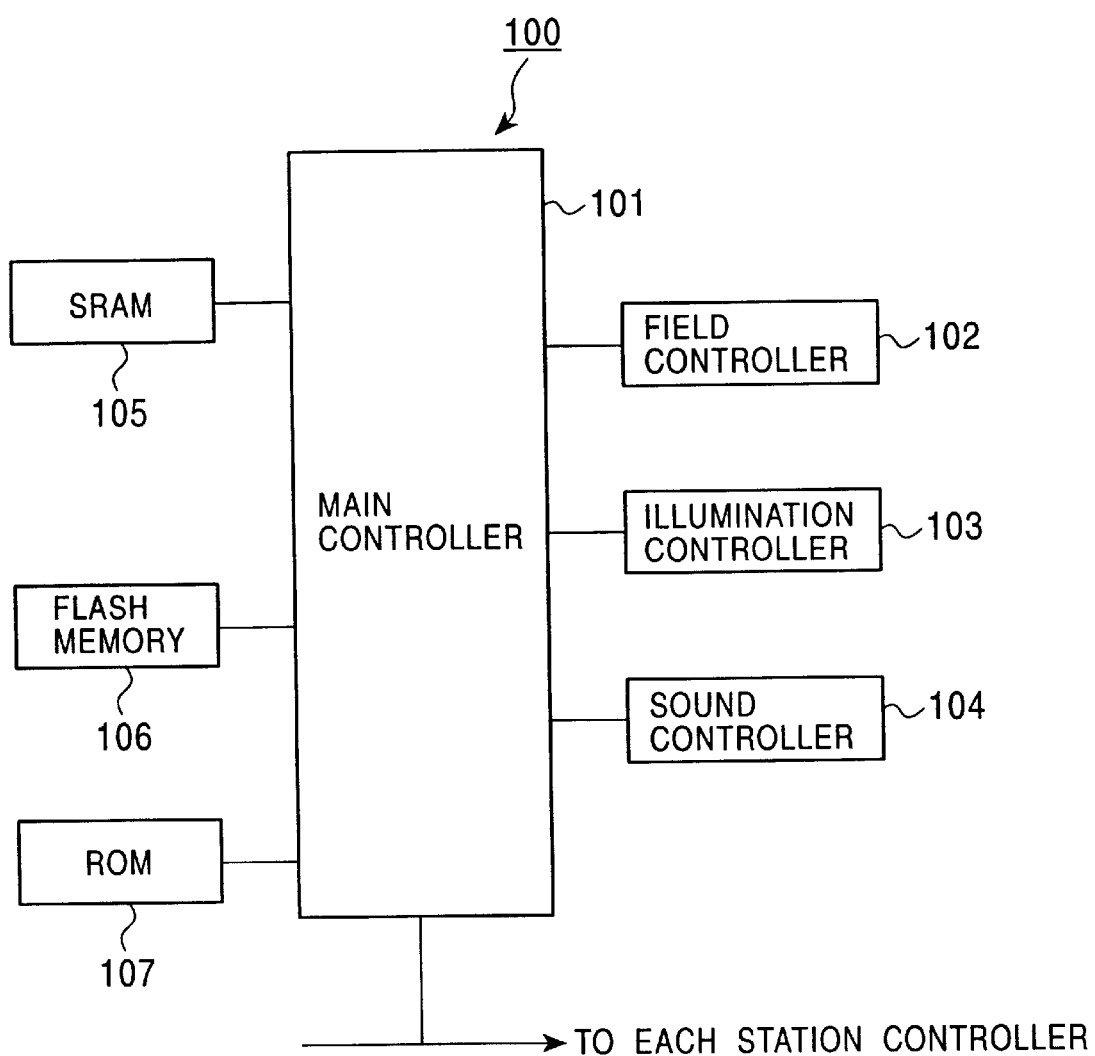
FIG. 4 is a control block diagram showing a main control unit of the arcade game machine of FIG. 3.
Figure 5:
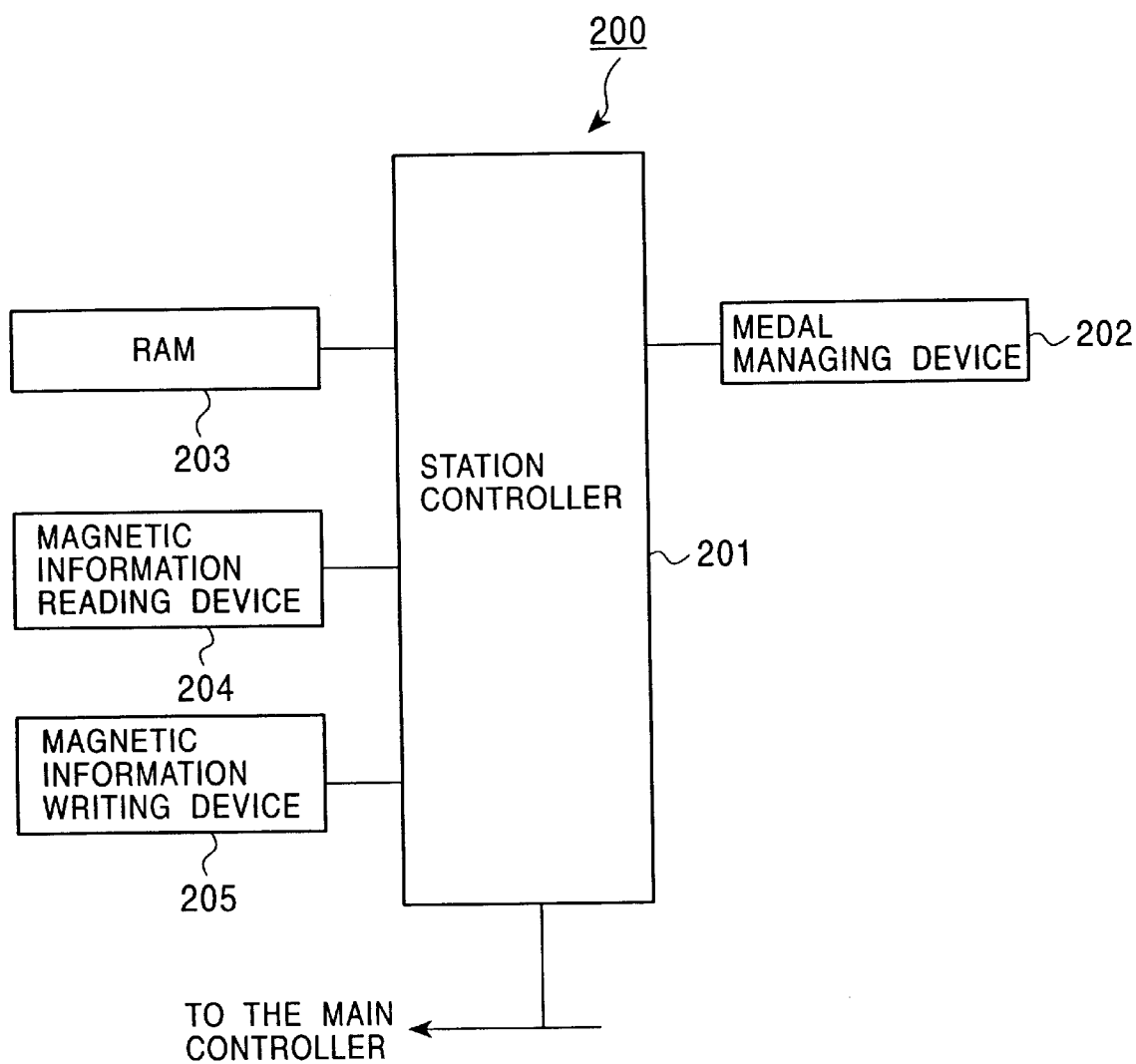
FIG. 5 is a control block diagram showing a station control unit of the arcade game machine of FIG. 3.

FIG. 4 shows a control block diagram of a main control unit 100 for the integral control of the operation of the arcade game machine 1. FIG. 5 shows a control block diagram of a station control unit 200 provided at each of the stations 10.

As shown in FIG. 4, the main control unit 100 disposed on the side of the field 2 comprises a main controller 101, a field controller 102 for controlling the running and the like of the model horses on the field 2, an illumination controller 103 for controlling the illuminating device 7, an sound controller 104 for controlling the cheers and on-the-spot broadcast supplied by the speakers 5, an SRAM (i.e., Static Random Access Memory) 105 and a flash memory 106 for storing various data for individual players, and a ROM (i.e., Read Only Memory) 107 in which programs necessary for the game and various database are stored. The main controller 101 is connected to the field control unit 102, the illuminating device 103, the sound controller 104, the TRAM 105, the flash memory 106 and the ROM 107, respectively. The ROM 107 stores a database on the players' horse, together with their voice data, which are prepared in large number for selection by the player, various data on individual horses, and race itinerary, for example.

As shown in FIG. 5, a station control unit 200 provided at each of the stations 10 comprises a station controller 201, a medal managing device 202 for managing the dispensing of the medals and the like, a RAM (i.e., Random Access Memory) 203 for temporarily storing various player data, a magnetic information reading device 204 for reading the magnetic information on the magnetic card inserted into the magnetic card insertion slot 15, and a magnetic information writing device 205 for writing various information such as the ID code on the magnetic card. The station controller 201 is connected to the medal managing device 202, the RAM 203, the magnetic information reading device 204 and the magnetic information writing device 205. The station controller 201 is further connected to the display 11 and the touch panel 12 provided at each of the stations 10 as shown in FIG. 3, a medal insertion sensor, which is not shown, for detecting the insertion of medals inserted in the medal slot 14, and a magnetic card drive device, not shown, for driving the magnetic card inserted through the magnetic card insertion slot 15, respectively.

Further, as shown in FIGS. 4 and 5, the station controller 201 on the side of each of the stations 10 is connected to the main controller 101 on the field 2 side, allowing necessary communication to be made between them.

FIG. 6A is a drawing for the explanation of the data structure of player data which is recorded and managed for each player. The player data includes an ID code assigned to each player, personal information about the player, owned-horse information about the horse owned by the player, final play date information for identifying the date on which the player played the game last, write-over information for recording renewal of data, and a check code for preventing any tampering of the magnetic card. The player data also includes information concerning the state of the game and its history, and layout information about screens irrelevant to the game's proceedings. The ID code is a number uniquely assigned to each player, and it is set in such a manner as to be different from that of the other players. The personal information, owned-horse information and final play date information are used as game histories for ensuring the continuity of the interrupted game. The player data is stored in the SRAM 105 or the flash memory 106 of FIG. 4.

The above-mentioned personal information includes information concerning the individual player, such as his name and the total number of plays. The personal information is used as client management data, as well as data to be reflected in the game contents when, for example, using the players' name as the name of the owned-horse.

The owned-horse information includes, for each owned-horse, a horse-name code for identifying the name of the owned-horse, horse type information for identifying the growth curve indicating the manner in which growth occurs, sex, age, number of races run, speed, stamina, condition, total sum of prize money won, and race-by-race past results (e.g., 1st, 2nd, no place), for example. The horse-name code is associated with the individual horse-name data within the horse-name database stored in the ROM 107, and based on this horse-name code, the horse data is read for use in the game.

FIG. 6B is a drawing for the explanation of the data structure of the written data which is written into the magnetic card when the player leaves play unfinished. The written data stores a part of the above-mentioned player data. Specifically, it records the ID code, the check code, and layout information about screens irrelevant to the game proceedings.

When the player wants to resume the game, he or she inserts the magnetic card into one of the stations 10 arbitrarily. The check code recorded in the magnetic card is then read and assessed to determine whether the information written therein is valid or not. The ID code recorded in the magnetic card is then read. Thereafter, the player data corresponding to the ID code is read from the SRAM 105 or the flash memory 106 of FIG. 4. The thus read player data is read into the RAM 203 of FIG. 5 at each of the stations 10 and utilized for predetermined processings. Thus, the player can resume the game at any desired time by using the magnetic card, and enjoy the game by continuously using the horse he or she has trained by themselves.

3. Structure of Web Server 20

Next, the structure of the Web server 20 forming the above game system will be described.

Figure 7:
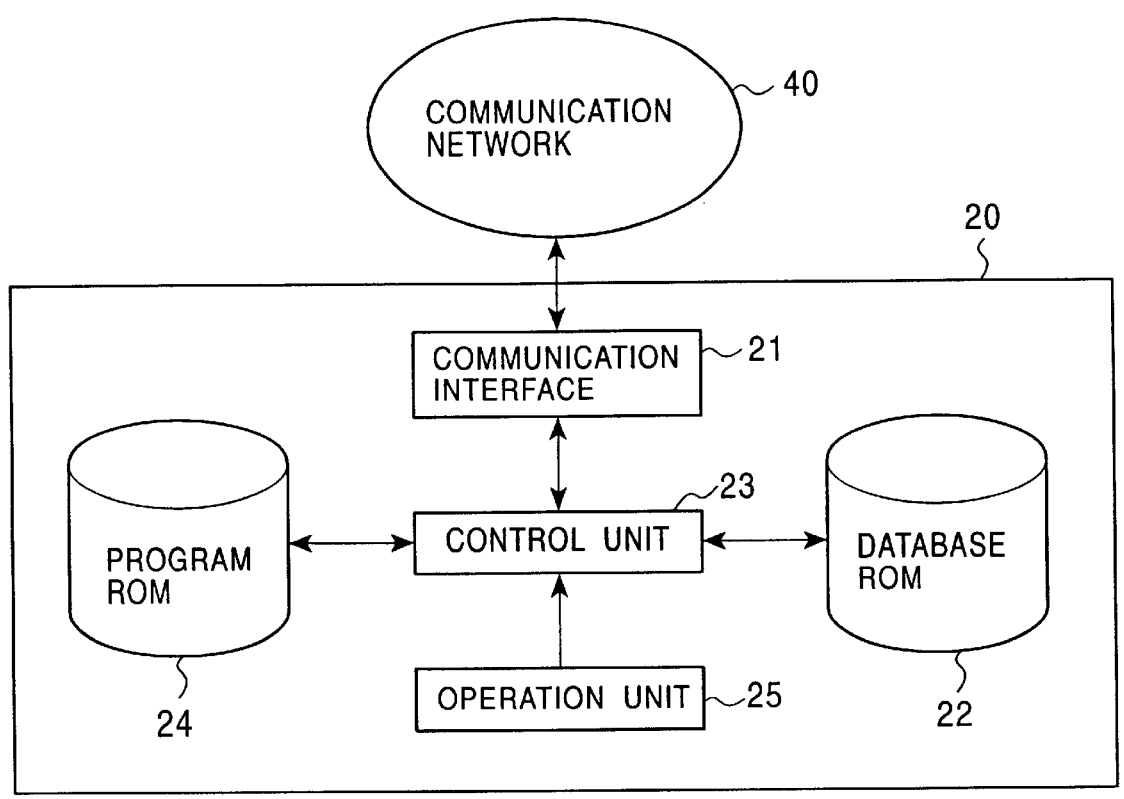
FIG. 7 is a block diagram of the overall structure of a Web server serving as a part of the game system according to the first embodiment.

FIG. 7 shows a block diagram showing the overall structure of the Web server 20. The Web server 20 comprises a communication interface 21, which is the password receiving device as the trained object information receiving and reading device comprising a terminal adapter or the like for transmitting and receiving data via the communication network 40, a the database ROM 22 as the training result information recording medium for storing various databases, a the control unit 23 for controlling the respective units of the Web server 20, a the program ROM 24 as the recording medium storing the program run by the control unit 23, and an operating unit 25 to be operated by an operator, for example:. The communication interface 21 also serves as the game information distributing device. The Web server 20 may comprise a general-purpose computer or workstation; it may also use, however, a part of the Web server run and managed by a specialized company.

The database ROM 22 stores a database concerning the same horse-name data and various data of respective horses as stored in the ROM 107 in the arcade game machine 1, and the race itinerary for the Internet Grand Prix, for example. The database ROM 22 also stores the personal information of the players who participate in the Internet Grand Prix and a database for the trained object information concerning the horse owned by each player. The database ROM 22 may be formed by the same ROM as the program ROM 24.

The program ROM 24 stores various programs run by the control unit 23, and those various programs are read out in accordance with instructions from the control unit 23. In addition to a site managing program for managing and running the horse racing game site, the program ROM 24 stores a game performing program for running the Internet Grand Prix held on the site, a communication program for communicating data via the communication network 40, and other programs necessary for the processing of the Web server 20.

The control unit 23 comprises at least one processor such as a CPU (i.e., Central Processing Unit), and a RAM for the temporary storage of program data and the like. The control unit 23 starts up and controls the Web server 20 by reading a predetermined operating system (OS) stored in the program ROM 24. Furthermore, the control unit 23 runs various programs recorded in the program ROM 24 and performs processings according to those programs. It is to be noted that a plurality of processors such as CPUs may be provided for running the various programs, so that the running of the programs is distributed among the respective processors.

4. Structure of Player Terminal 30

The structure of the player terminal 30 being part of the above game system will be described hereunder.

Figure 8:
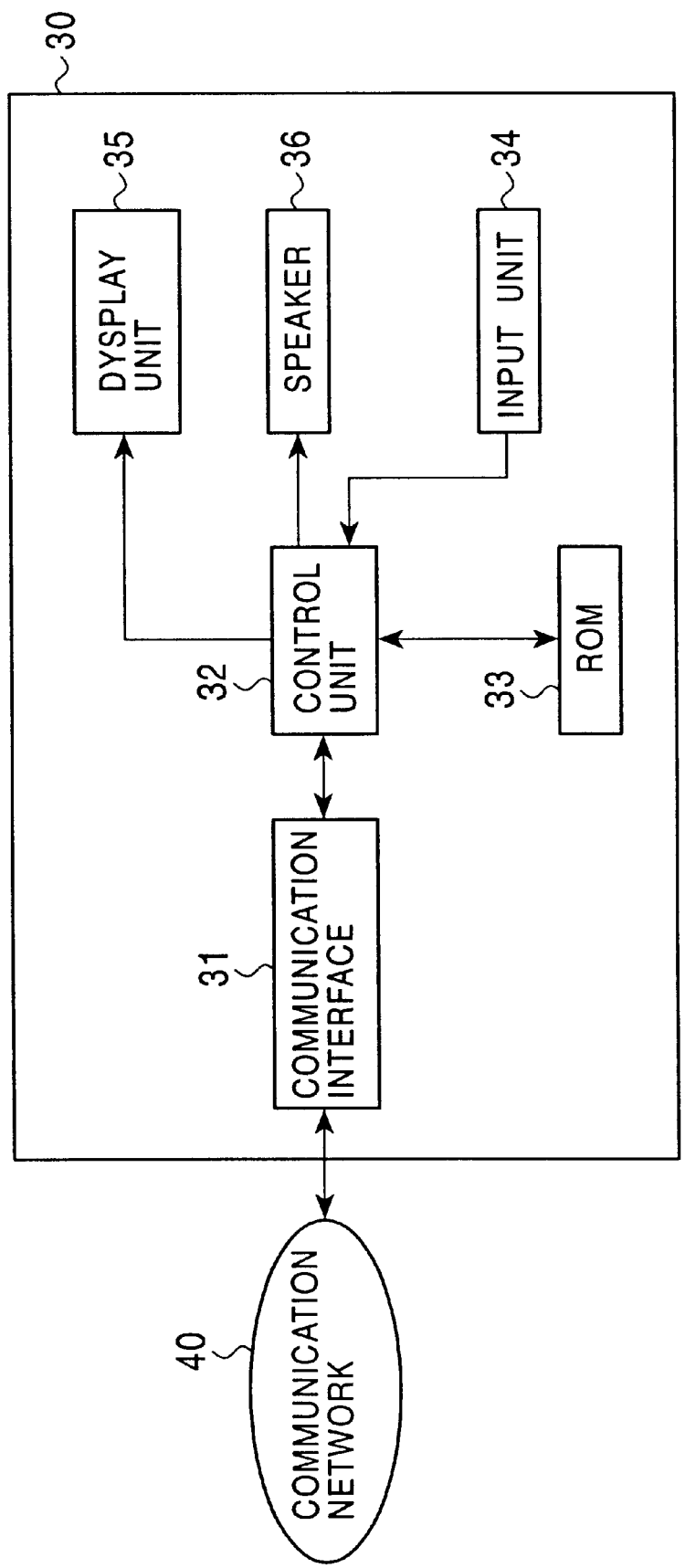
FIG. 8 is a block diagram of the overall structure of a player terminal serving as a part of the game system according to the first embodiment.

FIG. 8 shows a block diagram of the overall structure of the player terminal 30. The player terminal 30 allows access to the horse racing game site managed by the Web server 20 and provides the players with various information disclosed on the site, and also allows the players to take part in the Internet Grand Prix held on the site. The player terminal 30 may comprise a general-purpose personal computer, which is in widespread use recently in households; or alternatively, a family game machine, household electric appliances such as a television set, or mobile devices such as a cell phone, as long as they are capable of connection with the Internet to access the horse racing game site so as to perform the necessary operations and processings.

The player terminal 30 comprises: a communication interface 31 formed, as the trained object information output device and game information receiving device, by a terminal adapter or the like for transmitting and receiving data via the communication network 40; a control unit 32 for controlling various units; a ROM 33 storing a program run by the control unit 32; an input unit 34 as the entry application input device and trained object information input device to be operated by the player for inputting various demands; a display unit 35 serving as the game information providing device for displaying the image data and other displayed data obtained from the Web server 20; and a speaker 36 serving as the game information providing device for outputting the audio data and other audible data obtained from the Web server 20. In the present embodiment, the input unit 34 comprises a keyboard and a mouse. Instead of the speaker 36, a pair of headphones or an earphone may be used.

The ROM 33 stores a communication program for accessing the horse racing game site managed by the Web server 20, a browser program for browsing various information disclosed on the site, and the like. The various programs stored in the ROM 33 are run by the above-mentioned control unit 32. For the browser program, a commercially available or distributed browser program may be used.

The control unit 32 has the same structure as the control unit 23 of the Web server 20, and operates to start up and control the player terminal 30 by reading the stored OS. The control unit 32 also runs the various programs recorded in the ROM 33 and performs processings according to the programs.

5. Overall Flow of System

The following describes the flow of the training of the owned-horse in the arcade game machine 1 by the player, and the actual entry in the Internet Grand Prix managed by the Web server 20 while reflecting the various performance data as the training result information of the owned-horse.

Figure 1:
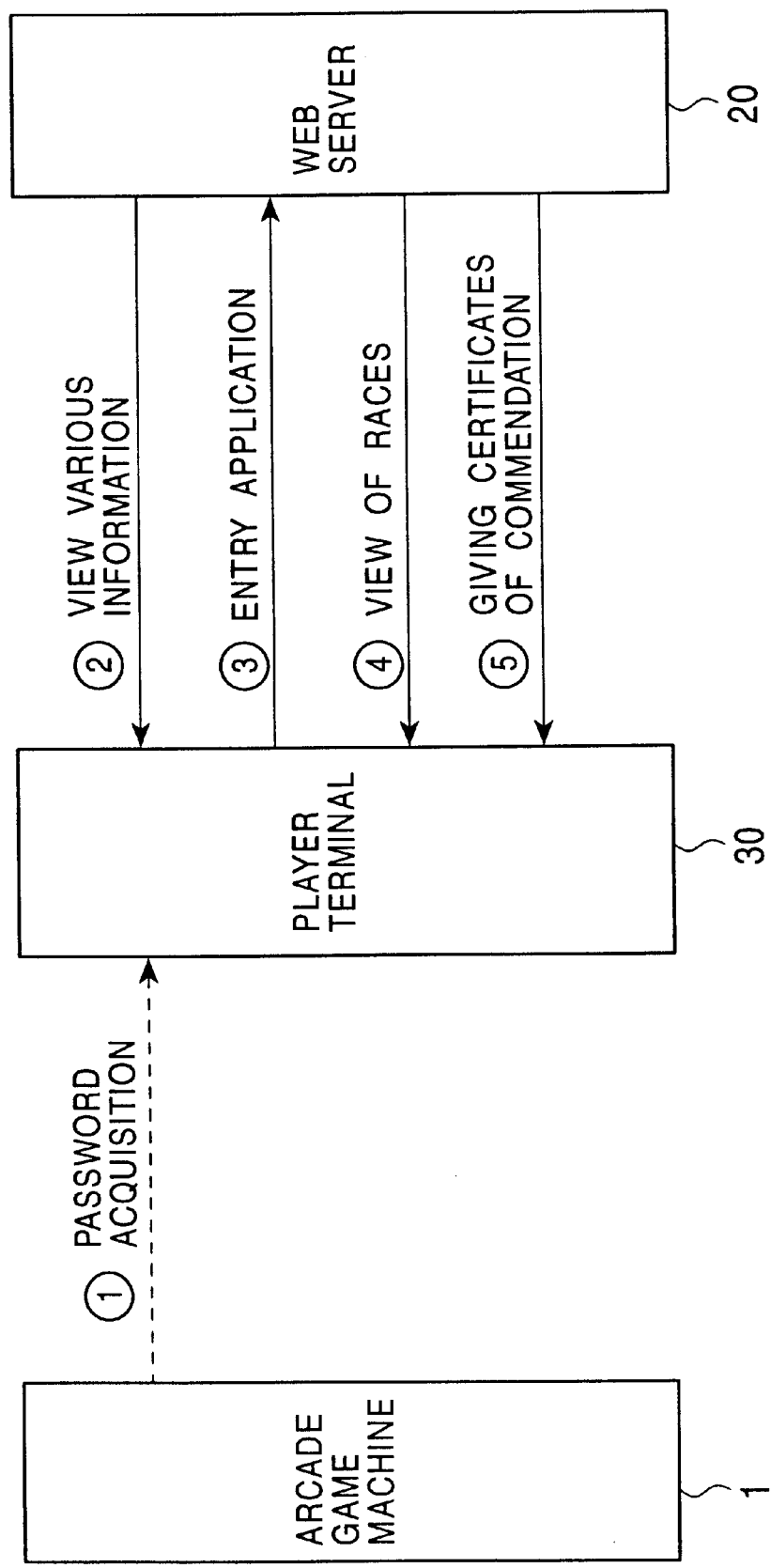
FIG. 1 is a diagram showing the flow of a game system according to a first embodiment.

FIG. 1 shows the flow of the game system according to the present embodiment. In this game system, the player first plays as the owner in the arcade game machine 1, and obtains the password which is a character sequenced-form of a part of the player data obtained during the playing of the game as the trained object information (step 1). The player can access the horse racing game site and view the various information on the site (step 2). The player can also use the obtained password to apply for entry in the Internet Grand Prix (step 3). Furthermore, the player can view the race in which they are participating (step4). A certificate of commendation is issued to the winner of the race as a privilege (step 5).

6. Acquisition of Password: Step 1

In order to obtain the password for entry in the Internet Grand Prix, the player must satisfy the condition that he or she plays the arcade game machine 1 and wins the GI race prepared in the game three times or more or acquires at least 2000 medals (lifetime prize money won). The owned-horse that retires after having met one of these conditions becomes a distinguished horse, and the password screen shown in FIG. 9 is shown on the display 11. In this password screen, the name of the distinguished horse ( . . . Bryan), the password, and an explanation of how to use the password are shown. The player then makes note of the displayed password and will be able to obtain the password.

In the present embodiment, the display 11 is used as the password output device, i.e. the trained object information output device, and the trained object information is output in the form of the password. This, however, should not be taken as limiting the embodiment, and the trained object information may be output by any arrangement as long as it is capable of outputting the information in such a manner as to be usable in the Internet Grand Prix held on the Web server 20. For example, the arcade game machine 1 may be provided with a printer as the password output device, so that the password may be printed out on a paper medium and given to the player. Alternatively, the password may be recorded on a portable recording medium such as an FD in the form of text data, and then the FD and the like may be handed to the player. In this case, it will be necessary to provide the arcade game machine 1 with a drive as a writing device for writing the password data onto the FD and the like. It is to be noted that if the trained object information is to be written in the portable recording medium as electronic data, the trained object information does not have to be in the password format, but may be recorded as electronic data in accordance with a predetermined format.

The trained object information included in the password includes an apparatus code as the apparatus information, the year, month, and day of retirement as the date information, a date-specific number as the date-specific order information, the players' name, horse-name code, the GI race won, total results, the speed and stamina performance at the height of the horse's performance as the training result information, the lifetime prize money won as the acquisition information, and the check code. The apparatus code is for the identification of the arcade game machine 1 where the owned-horse associated with the password was trained. The apparatus code includes numerals uniquely associated with each the arcade game machine 1. The year, month and day of retirement is the date on which the password was shown on the display 11. The date-specific number is a number for the identification of the place in the order in which the password was shown on the display 11. The player name and the horse-name code are identical to the player name and the horse-name code that were used as the player data in the arcade game machine 1, respectively. The check code is a sequence of characters representing the result of an arithmetic operation of code data, indicating respective information in accordance with a predetermined formula.

In the arcade game machine 1, the apparatus code, the year, month and day of retirement and the date-specific number are included so as not to output a redundant password with respect to another arcade game machine 1 installed at another game establishment. However, if the year, month and day of retirement is not included, the apparatus code and the serial number information concerning the password shown on the display 11 in the arcade game machine 11 may be included.

In the present embodiment, the speed performance and stamina performance at the height of the horse's performance are used as the performance data to decide the performance of the owned-horse in the Internet Grand Prix. Those data, including the speed performance at the height of the horse's performance, can be obtained by reading the performance data measured during the best condition in the past from the past performance data recorded in the trained object information recording medium, the SRAM 105 or the flash memory 106. The best performance data in the best condition may alternatively be stored in the SRAM 105 or the flash memory 106. The best performance data is updated if a better performance is obtained.

Since the arcade game machine 1 is designed to issue the password at the time of retirement, the player would have to participate in the Internet Grand Prix with the owned-horse having a reduced performance level if its performance data is determined at the time of the password issue. This disadvantage is overcome in the present embodiment by using the performance data of the horse at its height, so that the player can enter the horse in the Internet Grand Prix in its optimum condition.

In the arcade game machine 1, various data including the condition and the age, as well as the speed and stamina performances, are used as the owned-horse's performance data. However, if all the training result information is to be included in the password, it would result in a very long character sequence. Accordingly, in the present embodiment, the performance data to be reflected in the Internet Grand Prix is limited to the speed performance and the stamina performance, in order to make the password shorter and thereby burden the player less. It should be noted, however, that if such arrangements to allow the performance data to be reflected in the Internet Grand Prix without using the password are provided, the performance data does not have to be limited by the above-mentioned manner. It will be readily understood that a more elaborate race development can be presented by increasing the amount of performance data to be reflected in the Internet Grand Prix.

7. Browsing of Various Information: Step 2

Players can also access the horse racing game site managed by the Web server 20 by using, for example, their own personal computers at home as the player terminal 30.

Figure 10:
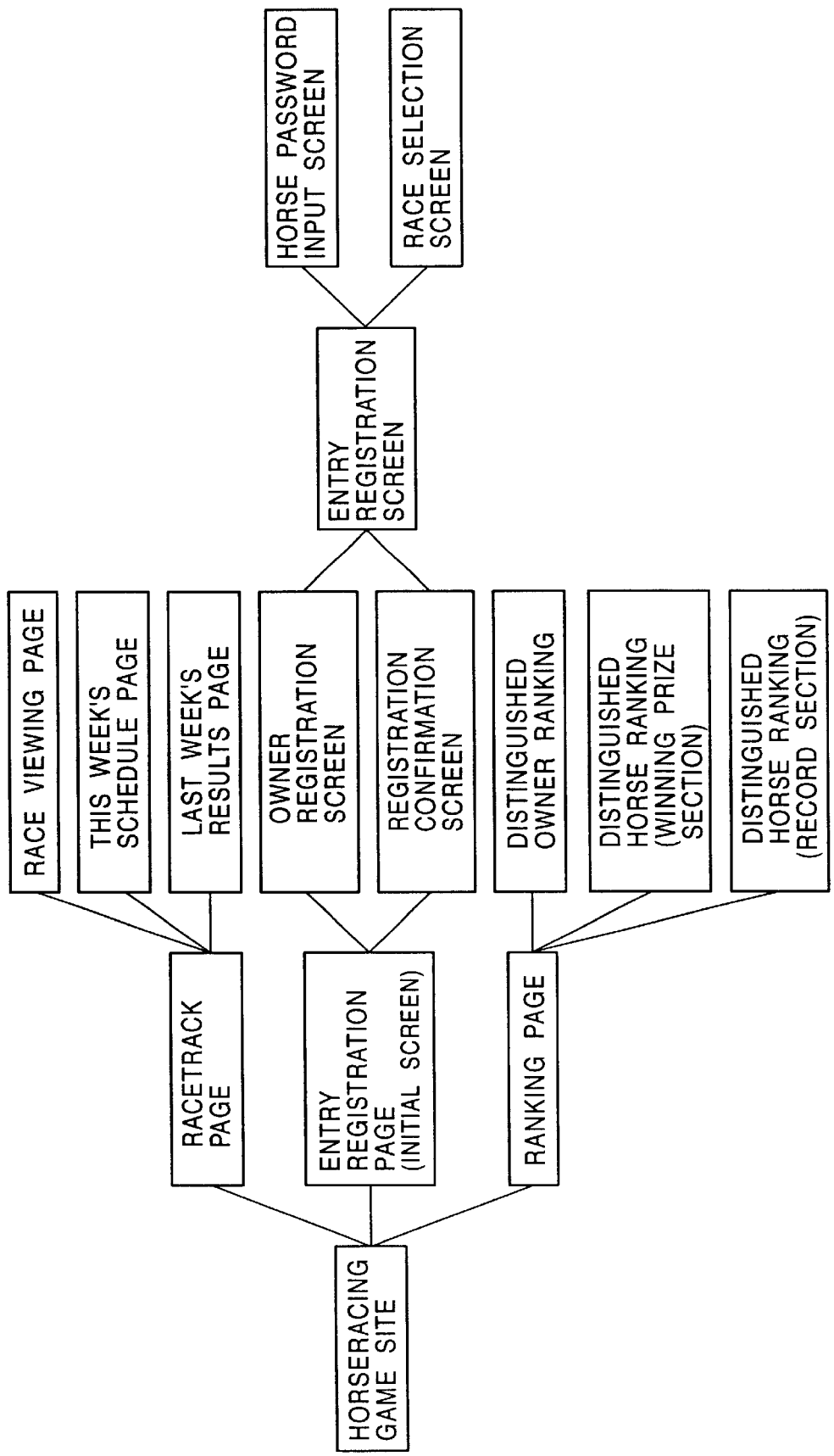
FIG. 10 is a diagram illustrating the site structure of a horse racing game site run by the Web server.

FIG. 10 shows the structure of the horse racing game site. This horse racing game site provides a racecourse page where viewers can watch the race or view the race itinerary or past race results, an entry registration page for the registration of an entry as a entry application, and a ranking page where various rankings are shown.

In the present embodiment, the Internet Grand Prix is held once a week on the horse racing game site under the management of the Web server 20. Five races are held on Friday nights, for example. The races can be participated in by those players having a password, and the races are broadcast on the race watching page arranged on, the racecourse page as shown in FIG. 11, so that the players can watch. Other information including the period of acceptance of entry applications for the respective races, the race itinerary and the race results are disclosed on this week's race schedule and last week's results page within the racecourse page. On the ranking page, such rankings as an distinguished owner ranking as shown in FIG. 12A, based on the results in the Internet Grand Prix, and a distinguished horse ranking, as shown in FIG. 12B, are disclosed. The distinguished horse ranking includes the winning prize portion and the record portion which are based on the results in the arcade game machine 1. Thus the players can view those rankings. The entry registration page will be described later.

8. Entry Application: Step 3

The player, having obtained the password in step 1 takes the password home, for example, and can access the entry registration page on the horse racing game site managed by the Web server 20 by using his personal computer as the player terminal 30.

FIGS. 13(*a*) to (*f*) are drawings explaining the respective screens shown on the display unit 35 when the player views the entry registration page on the player terminal 30. As the player accesses the entry registration page by using the player terminal 30, the display unit 35 initially shows the initial screen as shown in FIG. 13(*a*). This initial screen includes a description for entry in the Internet Grand Prix, an owner registration button for moving onto an owner registration screen for the registration of ownership, and an entry registration button for moving onto a registration confirmation screen for confirming the registration prior to entry registration.

Those who participate in the Internet Grand Prix for the first time must first register their ownership. To do that:, the player operates the mouse serving as the input unit 34 and clicks on the owner registration button on the initial screen. This causes the owner registration screen to appear on the display unit 35 as shown in FIG. 13(*b*). On this owner registration screen, the player inputs, using the keyboard as part of the input unit 34, the player's e-mail address for allowing communication from the Web server 20 to the player, the owner name, and an access password which will be required for personal identification purposes when the player registers for entry in the future. The thus input owner name and access password are independent of the arcade game machine 1. When the predetermined input items have been input, the player clicks on the send button shown on the owner registration screen. This causes the respective input items to be output via the communication interface 31 by the control unit 32 running the communication program and sent to the Web server 20 via the communication network 40.

In the Web server 20, the input items are processed by the control unit 23 running the owner registration program stored in the program ROM 24, so that the control unit 23 registers the access password and e-mail address, in association with the owner's name, in the owner registration database in the database ROM 22. After the registration processing is complete, an entry registration screen as shown in FIG. 13(*d*) is output to the player terminal 30.

Those players who have already registered their ownership in the past click on the entry registration button on the initial screen. This causes the registration confirmation screen as shown in FIG. 13(*c*) to appear in the display unit 35. This registration confirmation screen is identical to the owner registration screen shown in FIG. 13(*b*), except that the former does not include the e-mail address input column. As in the case of the owner registration screen, the player then clicks on the send button after the input of the owner name and access password, thereby sending those input items to the Web server 20. On receiving the input items, the Web server 20, using the control unit 23 for running the registration confirmation program stored in the program ROM 24, reads the access password from the owner registration database in the database ROM 22 on the basis of the received owner name. The Web server 20 then checks the thus read password against the received access password and, if they correspond, outputs the entry registration screen shown in FIG. 13(*d*) to the player terminal 30. If they do not correspond, the Web server 20 outputs a message such as "The password is incorrect" to the player terminal 30.

After completing the owner registration or registration confirmation, the display unit 35 of the player's player terminal 30 displays the entry registration screen as shown in FIG. 13(*d*). If the owned-horse the player is about to register for entry has never run before, the player clicks on the distinguished horse registration button shown on the entry registration screen. This causes an owned-horse password input screen as shown in FIG. 13(*e*) to appear. In this owned-horse password input screen, the player then inputs the password he obtained in the arcade game machine 1, and clicks on the send button. As a result, the password is output via the communication interface 31 by the control unit 32 running the communication program and sent to the Web server 20 via the communication network 40.

In the Web server 20, the password received via the communication interface 21 is deciphered by the control unit 23 running the password deciphering program stored in the program ROM 24 as the password deciphering device, and various information such as the performance data are obtained from the password. Then, the control unit 23 running the password assessing program functioning as the password assessing device reads the check code from the deciphered password, and determines whether or not the password is correct based on the check code. In this assessment, the control unit 23 arithmetically processes the thus read check code backwards in accordance with the formula used in the arcade game machine 1, and compares the resultant code data with code data such as the apparatus code contained in the password. If the comparisons correspond, the password is assessed to be valid, and if not, invalid.

In this assessment, if the password is determined to be in-valid, a password error notification is transmitted to the player terminal 30 from which the password has been sent, thereby causing the owned-horse password input screen shown in FIG. 13(3) to be once again displayed on the display unit 35 of the player terminal 30. On the other hand, if the password was assessed to be valid, the various information contained in the password is registered in the owner registration database in the database ROM 22 by the control unit 23 running the information registration program stored in the program ROM 24 as the training result information recording device. If, however, the received password is assessed to be identical to that of an owned-horse already registered as a distinguished horse in the owner registration database, another notification is sent to the player terminal 30 indicating the previous registration, and the owned-horse password input screen of FIG. 13(*e*) is again displayed on the display unit 35 of the player terminal 30. After those distinguished horse registration processings are complete, the entry registration screen of FIG. 13(*d*) is again output to the player terminal 30.

After the distinguished horse registration is complete, the name of the owned-horse registered for the distinguished horse, the lifetime prize money won, total results, and the GI race won in the arcade game machine 1 are displayed. If the owned-horse has run in the Internet Grand Prix in the past, the results in the Internet Grand Prix will also be displayed. If the player wants to register entry in the Internet Grand Prix, he or she clicks on the entry button on the entry registration screen. This causes the entry application to be output via the communication interface 31 by the control unit 32 running the communication program, and sent to the Web server 20 via the communication network 40.

In the Web server 20, the control unit 23, running the entry decision program as the entry decision device, assesses whether or not to accept the entry of the player who made the entry application, on the basis of the entry application received via the communication interface 21 as the entry application receiving device.

FIG. 14 shows a flowchart of the control performed by the control unit 23 running the entry decision program.

The control unit 23, upon receiving the entry application, reads the year, month and day of retirement of the owned-horse concerning the entry application from the owner registration database in the database ROM 22 (S1) Based on the retirement year, month and day, the control unit 23 determines whether or not the entry of the owned-horse is within the term of validity (S2). In the present embodiment, since the term of validity of the password is set at 90 days, it determines whether the retirement year, month and day is no more than 90 days ago.

If it is determined that the retirement year, month and day is more than 90 days ago, a notification of validity term error is sent to the player terminal 30 from which the entry application has been sent (S3), and the entry registration screen of FIG. 13(*d*) is once again output (S4). On the other hand, if the retirement year, month and day is determined to be within the past 90 days, it is determined, by searching the entry registration database in the database ROM 22 where the information concerning the respective owned-horses and their owners that are about to enter the current Internet Grand Prix are stored, whether the owned-horse concerning the entry application has not already been registered for entry in any of the races (S5). If it is determined that the present entry will be redundant, a notification of redundant entry registration error is transmitted to the player terminal 30 from which the entry application has been sent (S6), and the entry registration screen of FIG. 13(*d*) is once again output (S4). Thus, the redundant registration of the same owned-horse for entry in the same race or multiple races can be prevented.

After thus checking the redundant entry registration, the GI race and the lifetime prize money won concerning the owned-horse for which the entry application has been made are read from the owner registration database in the database ROM 22 (S6). Based on the GI races won and the lifetime prize money won, races that the owned-horse can enter are selected (S7). The respective races in the race data table stored in the database ROM 22 are given predetermined conditions. In the above-mentioned selection of the races, therefore, the thus read GI race and the lifetime prize money won are checked against the conditions for each of the races in the race data table, and those races whose conditions are met are selected. Those conditions include, for example, a certain number or more of GI races won, a certain amount or more of the lifetime prize money won, and having won certain GI races.

Since each race in the present embodiment runs with 18 racehorses, the maximum number of horses that can be registered by the players for entry in a race is 18. For this reason, if there are already 18 horses registered for entry by some players in a race, other players are excluded from selection even if the owned-horses they wish to apply for entry satisfy the required conditions. In the present embodiment, the entry applications for entry registration are accepted on a first-come, first-served basis, and those races whose entry registrations are full will not be selected. However, the procedure may be arranged such that those races whose entry registration limits are reached can be selected, in which case entry registrations may be accepted beyond the entry registration limit and then the horses to enter the race can be determined after the application deadline in accordance with a predetermined condition.

The races held in the Internet Grand Prix may include those in which only male or female horses can enter, just like in some of the actual races. In this case, the password output by the arcade game machine 1 may include sex information about the owned-horse, and the races in which that owned-horse can enter are selected based on the sex information.

After the races are thus selected, the entry race selection screen where the selected races are displayed is output to the player terminal 30 (S8). This causes the entry race selection screen as shown in FIG. 13(*f*) to appear on the display unit 35 of the player terminal 30. The player, looking at the entry race selection screen, then decides on which race he will have his horse run in, selects the race by clicking on the box where the particular race is indicated, and clicks on the send button. This causes the entry-requested race data to be output via the communication interface 31 by the control unit 32 running the communication program, and sent to the Web server 20 via the communication network 40.

Upon receiving the entry-requested race data (S9), it is determined, by searching the entry registration database in the database ROM 22, whether the owner who has made the entry application is not the owner of an owned-horse that has already been registered for entry in the same race as the entry application has been made for (S10). If it is determined that the same owner has been registered for entry, the redundant entry registration error notification is sent to the player terminal 30 from which the application has been sent (S11), and the entry race selection screen of FIG. 13(f) is again output (S8). In that way, more owners can register for entry. If, on the other hand, it is determined that the same owner is not registered for entry, a notification of completion of entry registration is sent to the player terminal 30 from which the application has been sent (S12).

In the present embodiment, it has been described that the entry application for the Internet Grand Prix is made using the player terminal 30 via the communication network 40. However, the application can be made in other ways. For example, entry application forms may be previously distributed at establishments where arcade game machines 1 are installed, and the player may make the application by filling in one of the applications forms with the necessary information such as the obtained password, entry requested races, etc., and send it by mail to the Web server 20. In this arrangement, the items of information written on the entry application form may be input by an operator using the control unit 25 of the Web server 20, for example.

9. Race Watching: Step 4

After a predetermined term during which entry applications are accepted has elapsed, the control unit 23, which runs the game advance program stored in the program ROM 24 of the Web server 20 functioning as the game advance device and the game information distribution device, initiates the proceedings of the Internet Grand Prix at a scheduled time in accordance with the race itinerary stored in the database ROM 22. The respective races that proceed in the Internet Grand Prix are disclosed in real-time on the race watching page provided on the racecourse page, as shown in FIG. 11. The races disclosed on the race watching page can be watched not only by the players who have made entry applications for the Internet Grand Prix in step 3, but also by anyone who accesses this page.

Figure 15:
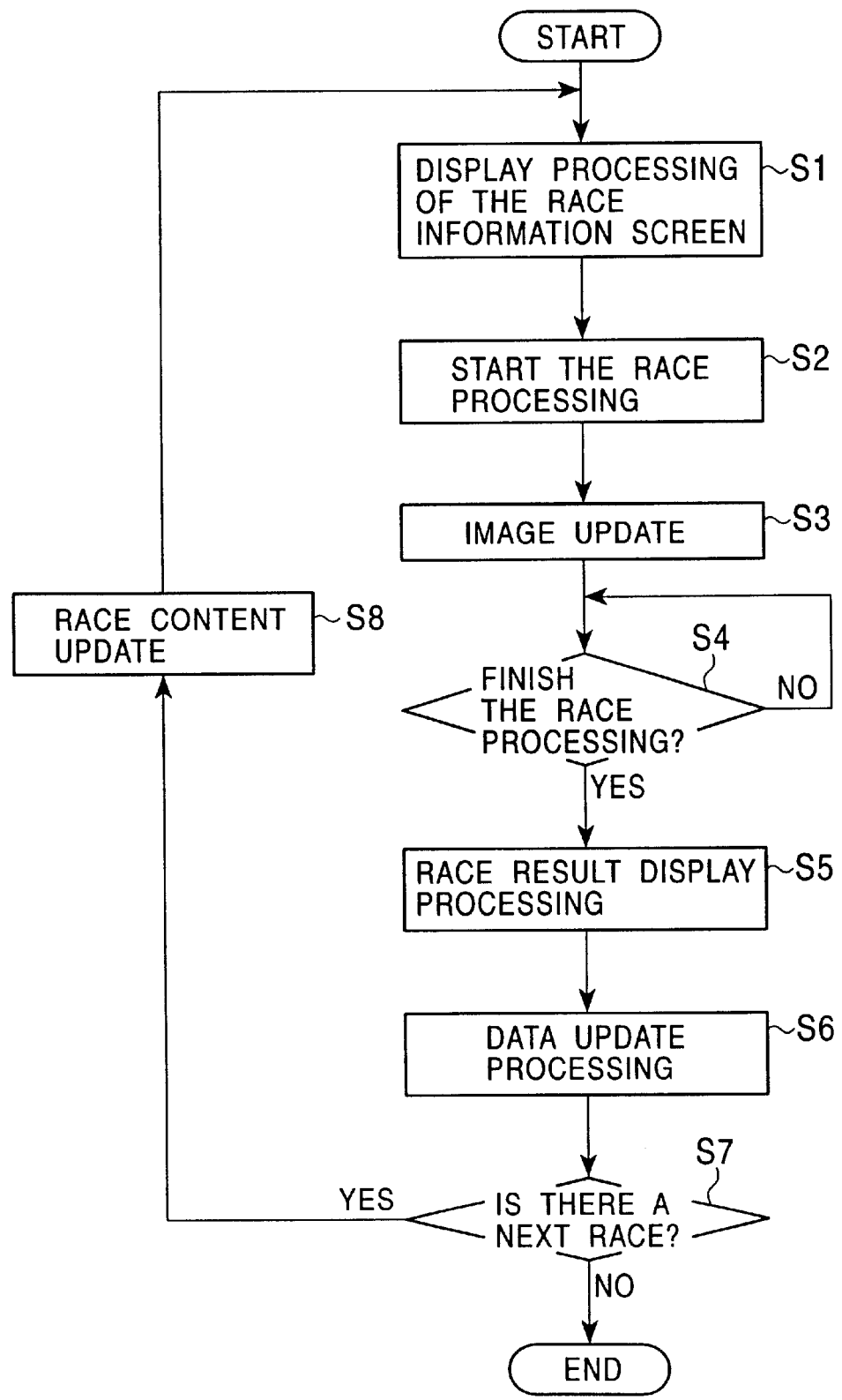
FIG. 15 shows a flowchart of the control operation by the control unit running a game execution program in the Web server.

FIG. 15 shows a flowchart of the game proceeding control for the Internet Grand Prix performed by the control unit 23 running the game running program. The control unit 23 carries out, for each race, the race processing for conducting the race by having the horses applied for entry run, the race result display processing for indicating the finish order of the race, and the data renewal processing for renewing the contents of the owner registration database in the database ROM 22 based on the race results. Five races are run in a single Internet Grand Prix, and the races take place successively on about 2-minute cycles including the race result display processing.

Figure 17:
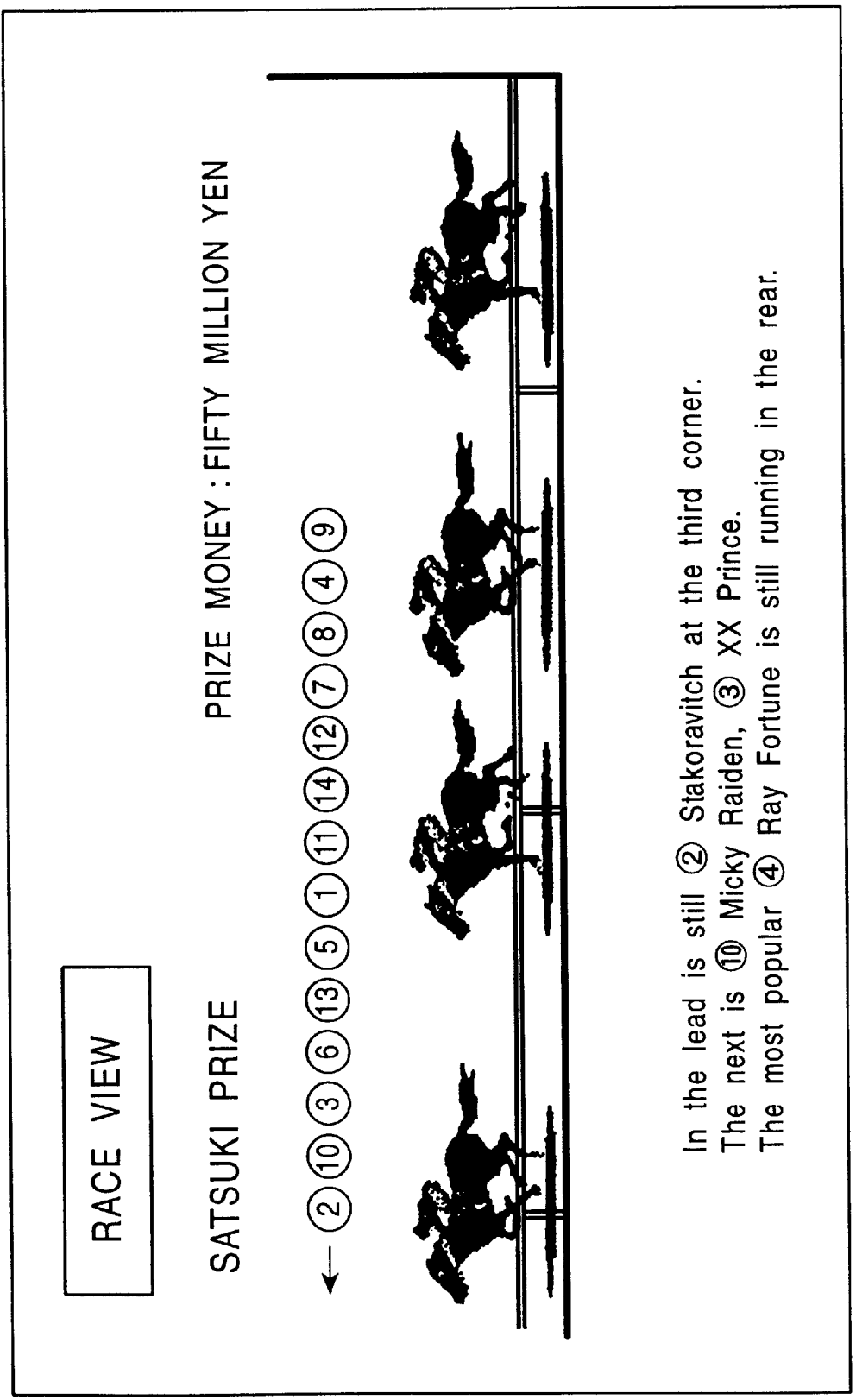
FIG. 17 is a schematic illustration of an example of a race screen displayed on the race watching page.

First, the control unit 23 executes the display processing for displaying the race information screen as shown in FIG. 16 on the race watching page (S1), thereby providing the players and the like with the information concerning the following races. At the time specified in the race itinerary, the race processing is carried out for realizing the images and audio sounds on the race watching page, and the race begins (S2). During the race, the race screen as shown in FIG. 17 is updated about every five minutes by the race processing (S3), which creates a realistic environment together with the cheers of the crowd. These images are downloaded to the player terminal 30 via the communication network 40, and displayed on the display unit 35.

As the race comes to an end (S4), the control unit 23 carries out the race result displaying processing for displaying the race results on the race watching page (S5), whereby the players watching the race are presented with the race result display screen as shown in FIG. 18 on the display unit 35. The race result display screen shows the finishing order of the race and the like. The control unit 23 then carries out the data renewal processing on various information about the respective horses and their finishing order and the like (S6). Thus, the history information including the race results of the respective horses is registered in the owner registration database.

After those processings are complete, the control unit 23 then determines whether there is a next race (S7). If there is, the control unit 23 renews the race contents to the next race contents (S8), returns to S1, and carries out the race processing, race result display processing and data renewal processing in the same manner as described above. After all the races are run and if it is determined that there are no more races (S7), the control unit 23 closes the Internet Grand Prix.

10. Granting of Letters of Commendation: Step 5

After the Internet Grand Prix is over, the owner of the horse that won the race is given a letter of commendation as a privilege. Specifically, the control unit 23, running the letter of commendation transmitting program functioning as the privilege granting device, reads the mail address of the winning owner from the owner registration database stored in the database ROM 22, and sends an e-mail attached with an image of a letter of commendation to the e-mail address. It should be noted that the privilege is not limited to the sending of the letter of commendation by e-mail as in the present embodiment. For example, electronic data in the form of a special icon may be sent or a letter of commendation or another kind of prize item may be e-mailed. The privilege may also comprise the granting of a qualification to participate in other games available on the Internet, or the giving of points available in other games. Furthermore, the privilege may be given not only to the winning owner, but also to the owner who earned the largest sum of prize money in the Internet Grand Prix as an distinguished owner, in the form of a letter of commendation.

11. Second Embodiment

In the following, the present invention will be described by way of another embodiment (to be hereinafter referred to as a second embodiment), where the present invention is applied to the same game system as in the first embodiment. The present embodiment differs from the first embodiment in that the arcade game machine 1 and the Web server 20 comprising the game system are connected via the network or the communication network 40. The following description concerns only those structures and operations different from those of the first embodiment.

Figure 19:
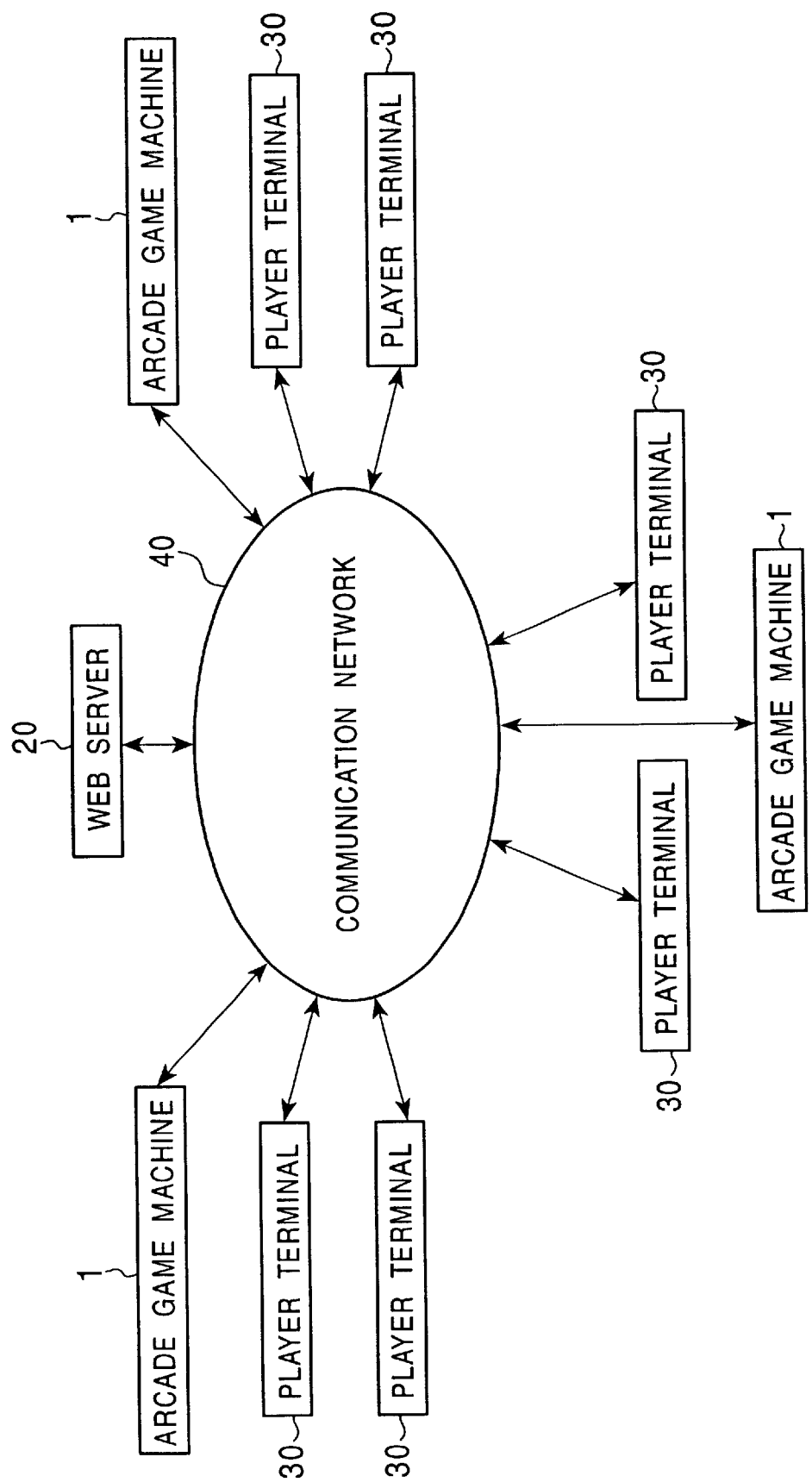
FIG. 19 is a diagram of the overall structure of the game system according to a second embodiment.

FIG. 19 shows the overall structure of the game system according to the present embodiment. This game system comprises the arcade game machine 1, as a variety of commercial game apparatus as in the first embodiment, the Web server 20 as the network game apparatus for running the Internet Grand Prix, the player terminals 30 as the client device connectable to the Internet, and the communication network 40 formed by the public telephone line, dedicated telephone line, cable television line, or radio communication line, for example. The arcade game machine 1 and the player terminals 30 are connected to the Web server 20 via the communication network 40, so that data can be communicated in both directions.

Figure 20:
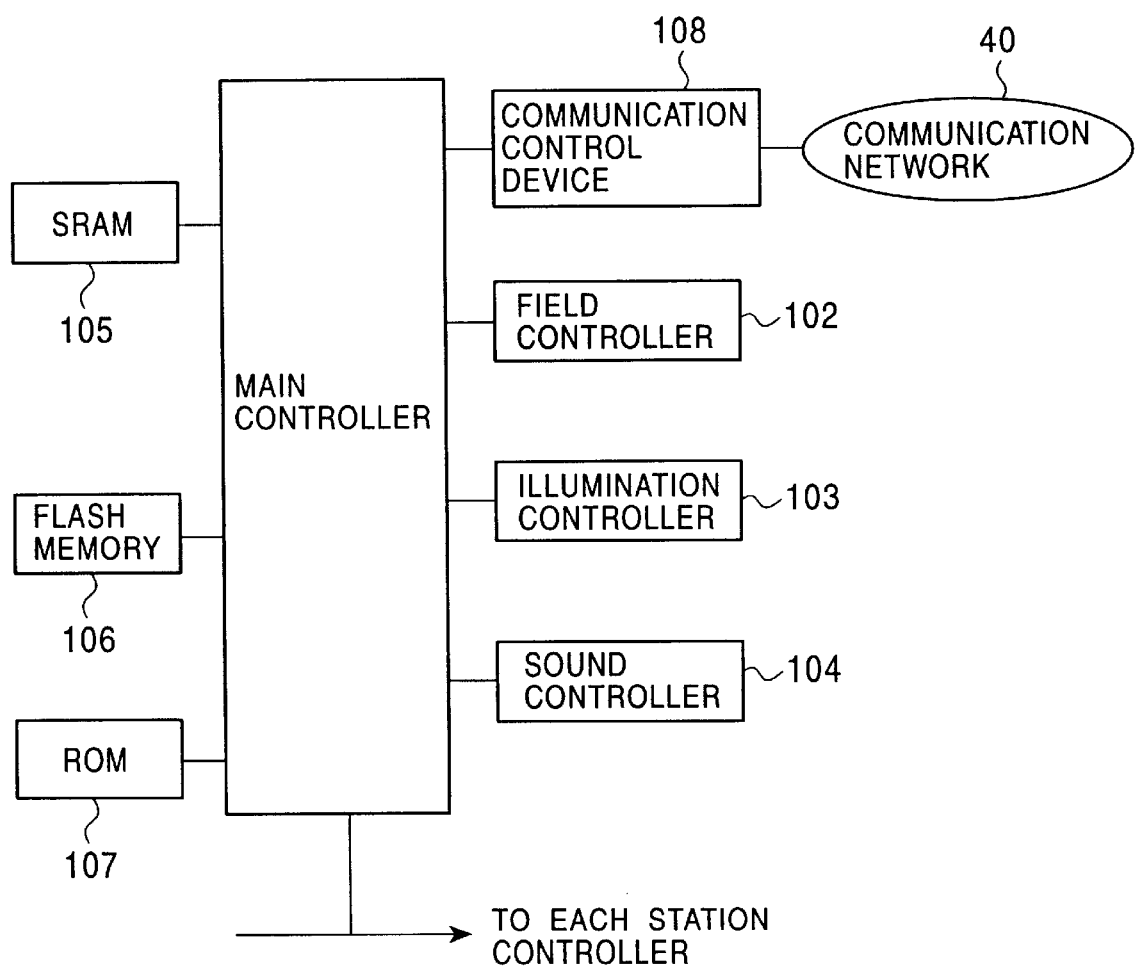
FIG. 20 shows a control block diagram illustrating a main control unit of the arcade game machine serving as a part of the game system according to the second embodiment.

FIG. 20 shows a control block diagram of the main control unit 100 for the integral control of the operations of the arcade game machine 1. The main control unit 100 comprises, in addition to the component parts of the first embodiment, a communication control device 108 as the training result information output device connected to a main controller 101. The communication control device 108 allows data to be communicated between the main controller 101 and the Web server 20 via the communication network 40.

As the player retires the owned-horse in the arcade game machine 1, a password is displayed on the display 11, as in the first embodiment. However, the contents of the password do not include such training result information as the speed and stamina performance in the horse's prime, such acquisition information as the lifetime prize money won, and such trained object information as the player name, horse name code, and the like. Instead, the password includes only the owned-horse identification code and the check code as the identifying information for identifying the owned-horse. Accordingly, the password includes far less information content and therefore requires less number of password characters.

The main controller 101 of the arcade game machine 1 that has output the password transmits the training result information, acquisition information and other trained object information, which were included in the password in the case of the first embodiment, to the Web server 20 via the communication network 40 from the communication control device 108 in association with the owned-horse identifying code. Accordingly, the amount of information about the trained object information to be transmitted from the arcade game machine 1 to the Web server 20 is not limited as it was in the password. For this reason, the training result information transmitted from the communications control device 108 includes other training result information such as the horse type information concerning the horse type used in the arcade game machine 1, in addition to the speed and stamina performance at the horse's prime. The training result information and the like transmitted from the arcade game machine 1 is received via the communications interface 21 as the training result information receiving device of the Web server 20, and registered in the owner registration database in the database ROM 22 by the control unit 23 running the information registration program stored in the program ROM 24 as the training result information recording device.

When the player applies for entry in the Internet Grand Prix, he or she accesses the horse racing game site run by the Web server 20, as in the first embodiment, and inputs the password on the owned-horse password input screen as shown in FIG. 13(e). Upon receiving the password as the entry application, the Web server 20 deciphers the password and extracts the owned-horse identification code. When running the entry decision program, the control unit 23 reads, based on the owned-horse identification code, various information already registered in the owner registration database in the database ROM 22 concerning the owned-horse applied for entry Then, the Web server 20 carries out the same processings as shown in FIG. 14.

The control operation of the control unit 23 for running the game running program is the same as in the first embodiment; however, in the present embodiment, other training result information such as the horse type information can be utilized, in addition to the speed and stamina performance at the horse's prime. Accordingly, more elaborate and complex race developments than the Internet Grand Prix in the first embodiment can be produced.

12. Third Embodiment

Hereinafter, the present invention will be described by way of a yet another embodiment (hereinafter referred to as a third embodiment), where the present invention is applied to the same game system as in the first and second embodiments.

In the first and second embodiments, the race developments of the Internet Grand Prix were determined by the owned-horse's overall performance data obtained in the arcade game machine 1. For that reason, in those embodiments the player, if he or she is to win the Internet Grand Prix, had to train a high-performance horse by playing the arcade game machine 1. This arrangement has the advantage of motivating the players to play on the arcade game machine 1 repeatedly. However, from the point of view of the players' convenience, it should be possible to train the owned-horse in the Internet Grand Prix, and this should be possible by adding a training program in the game running program as the training device. To provide such an arrangement, the present embodiment is designed such that, in the Internet Grand Prix as the network game to be run by the Web server 20 as the network game apparatus, a new horse can be created that has the performance data of the horse that had been trained in the arcade game machine 1 as the initial performance data. Other than this arrangement, the third embodiment is identical to the first and second embodiments.

Figure 21:
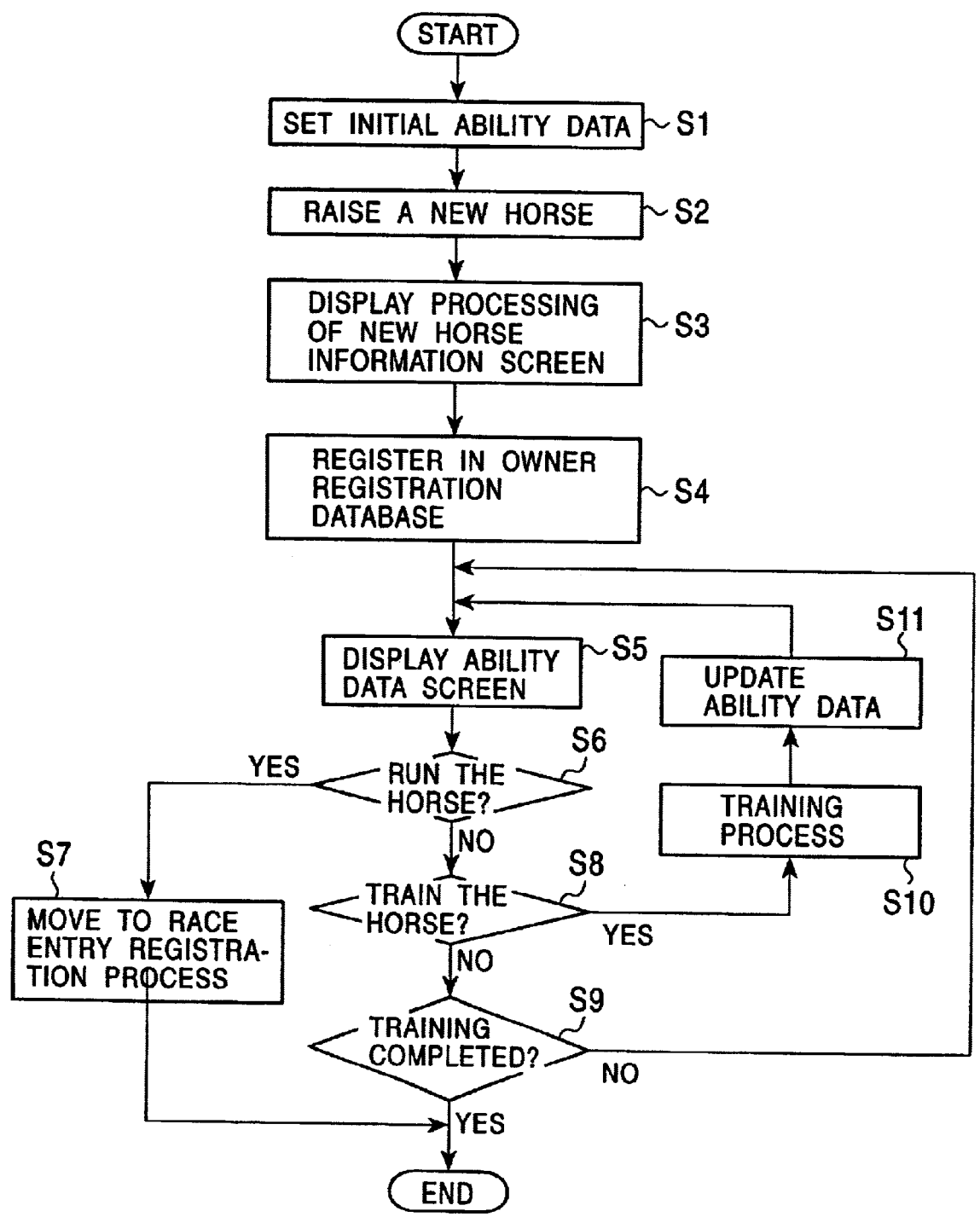
FIG. 21 shows a flowchart of an example of a training processing by the control unit running an initial setting program and a training program as a training device in the Web server serving as a part of the game system according to a third embodiment.

FIG. 21 shows a flowchart of an example of the training processing by the control unit 23 running an initial setting program which functions as the initial training result information decision device and the training program which functions as the training device. First, the control unit 23 sets the initial performance data as the initial training result information, based on the various performance data of the owned-horse that was registered as a distinguished horse on the entry registration screen in the first or second embodiment (S1). The initial performance data is higher as the performance data of the owned-horse training in the arcade game machine 1 is higher, and therefore it varies depending on the respective horses. A new horse is then trained that has the initial performance data (S2). In order to train the new horse, the player may have to pay a certain amount from the prize money won, which is the acquisition information acquired in the arcade game machine 1, for example. This would make it necessary for the players to win prize money in the arcade game machine 1 to train new horses in the Internet Grand Prix, thus motivating the players to play in the arcade game machine 1.

Thereafter, a display processing is performed to display a new horse information screen on the display unit 35 of the player terminal 30, where part of the performance data of the new horse is displayed and the player is asked to select and input necessary items of information concerning the new horse, such as its name (S3). After the player has selected and input the necessary items and such various information has been received, the various information is registered in the owner registration database in the database ROM 22, together with the initial performance data (S4).

After the new horse has been registered, a display processing is carried out to display a performance data screen for displaying the new horse's performance data on the display unit 35 of the player terminal 30 (S5). Then, the player is asked to select whether or not to register for entry in the Internet Grand Prix with the new horse (S6). If the player selects to register for entry, the procedure goes to the same entry registration processing as in the first or second embodiment (S7).

If, on the other hand, the player selects not to register for entry, the player is asked whether or not he or she wishes to train the new horse (S8). If the player chooses not to train, he or she is asked whether or not to end the training processing (S9). If he or she chooses not to end the training processing, the procedure goes back to S5 and the performance data screen is once again displayed. If, on the other hand, the player chooses to train, a training processing is performed for improving the performance data of the new horse by training it (S10). During the training processing, the player pays some amount of the prize money he or she won in the arcade game machine 1 to have the new horse trained. The more the player pays, the more the performance of the new horse will have improved after the training. As the training ends, the performance data of the new horse registered in the owner registration database is renewed with an either improved or deteriorated performance data as a result of the training processing (S11). Thereafter, the procedure goes back to SS and the performance data screen is displayed.

Thus, in accordance with the first to third embodiments, a player can enter his own horse which he trained in the arcade game machine 1 in the Internet Grand Prix held over the Internet, and therefore take part in the game together with many other players residing nationwide. However, a possible downside could be that as the number of participants increases in response to an increasing popularity of the Internet Grand Prix, more and more players would be unable to enter their horses in the Internet Grand Prix due to the limited number of horses that can be registered for entry.

In this event, a number of local races may be run in various regions of the country. In this case, a entry limit may be imposed such that only those owned-horses that were trained in arcade game machines 1 located within a particular region can participate in the local race. In the case of the first embodiment, for example, a regional race data table is stored in the database ROM 22 of the Web server 20, the table including local race data with which an apparatus code indicating the apparatuses that can be entered in the particular local race is associated. When a player has made an application for entry with the password he or she obtained, the apparatus code indicating the apparatus that can be entered in the local race for which the entry application has been made is read from the local race data table, and the entry is accepted or rejected on the basis of a comparison between the thus read apparatus code and the apparatus code included in the password. By holding such local races, it will be possible to organize a national championship among only outstanding horses gathered from the respective local races.

In the first to third embodiments, the various programs to be run by the control unit 23 of the Web server 20 can be obtained in the form of a recording medium such as a CD-ROM (i.e., Compact Disc-Read Only Memory). The same applies to the various programs to be run by the main control unit 100 or the station control unit 200 of the arcade game machine 1. Those programs are also available by receiving signals transmitted from the computer as the transmitter apparatus via a transmission medium such as the communication network 40. Those signals are computer data signals including programs embodied on a predetermined carrier wave. During such transmission, the transmission medium can carry only at least a part of the programs. That is, it is not necessary that there are all the data comprising the programs on the transmission medium all at once. The method of transmitting the programs from the computer includes both the case where the data forming the programs are continuously transmitted and the case where they are transmitted intermittently.

Although the first to third embodiments have been described with reference to the horse racing simulation game as the game system, this should not be taken as limiting the present invention, and it can be implemented in any game system as long as the arcade game machine 1 is a training-type game where a number of players can train their own trained objects, and as long as the players can enter those trained objects in a network game. In addition, the game executed in the arcade game machine 1 and the network game executed in the Web server 20 do not necessarily have to be identical. For example, various performance data such as the training result information of the characters trained in the arcade game machine 1 where a role-playing game is run may be obtained, and then the data can be handed to the Web server 20 where the horse racing simulation game as the network game is executed, the various performance data being converted into performance data of the racehorses in the horse racing simulation game. It should be noted here that the term "train" in the present invention includes the concept of improving or controlling the performance of any kind of trained object that appears during the game.

While in the first to third embodiments, the Internet Grand Prix was conducted by the control unit 23 of the Web server 20, the processings maybe distributed by providing a part of the game running program on the side of the player terminals 30 serving as the client device. Furthermore, a part or all of the processings performed by the arcade game machine 1, the Web server 20 and the player terminal 30 may be carried out by other devices serving as a part of the game system.

In the first aspect of the present invention, each player can reflect the training results obtained at the commercial game apparatus in the network game in which a number of other players can participate using a plurality of client devices in remote areas. Thus, the present invention provides a location where each player can play the games against a number of other players using their own trained objects, thereby providing a more convenient way for the players to enjoy the game together.

The second to twenty eighth aspects of the present invention provide a place where a number of players can play the games using their own trained objects that they trained by themselves, thus helping the players to enjoy the games even when they are residing at remote places.

In particular, in the third and fourteenth aspects of the present invention, the training result information can be reflected in the network game without putting too much of a burden on the players, even if there is a large amount of information, thereby enabling the network game to proceed in a more elaborate manner.

The fourth and fifteenth aspects of the present invention provide the advantageous effect that, since it does not require a separate arrangement for transferring the training result information in the commercial game apparatus to the network game apparatus apart from the trained object information, the total cost of the game system can be reduced.

The fifth and sixteenth aspects of the present invention provide the advantageous effect that, since the training result information in its best condition can be reflected in the network game, each player can play the game against other players while taking full advantage of the training result of his or her own trained object.

The sixth, seventh, seventeenth and eighteenth aspects of the present invention provide the advantageous effects that the trained object information in the commercial game apparatus can be transferred to the network game apparatus by such a relatively simple device as a password.

In particular, the seventh and eighteenth aspects of the present invention can prevent illicit use of the password, thereby ensuring the fairness of the network game.

The eighth and twentieth aspects of the present invention enable the entry in the network game to be limited to only those players who are in a particular region where a particular commercial game apparatus is located.

The ninth and twenty first aspects of the present invention enable the entry in the network game to be limited by setting a term of validity of the trained object information.

The tenth and eleventh aspects of the present invention prevent the output of identical trained object information among different players even if they have identical trained objects.

The twelfth and twenty fourth aspects of the present invention provide the advantage that the acquisition information acquired in the commercial game apparatus can be made a condition for entry in the network game or reflected in the performance of the trained object.

The nineteenth to twenty third aspects of the present invention provide the advantage that, since the entry of a player or his own trained object is allowed only when certain entry conditions are met, illicit entry can be prevented and a network game limited to a certain region can be realized.

In particular, the twenty second aspect of the present invention can prevent a redundant entry of the same trained object in the same game, thereby enabling the game to be played by many types of trained object.

The twenty third aspect of the present invention can prevent a redundant entry of the same player in the same game, thereby enabling the game to be played by multiple players. Furthermore, when a privilege is given to the winner of the network game, such an illicit act as a player occupying the game in order to win the privilege can be prevented, thereby helping to realize a fair network game.

The twenty fifth aspect of the present invention has the advantage that the player who desires a higher performance for his or her trained object can be motivated to use the commercial game apparatus.

The twenty sixth aspect of the present invention has the advantage of giving a privilege that is attractive to the players, thereby motivating the players to participate in the network game and also motivating them to play in the commercial game apparatus.

It is contemplated that numerous modifications may be made to the game system, the commercial game apparatus, the network game apparatus, the client device, and the recording medium, such as a computer readable medium, having recorded a program for controlling a computer included in the network game apparatus, of the present invention without departing from the spirit and scope of the invention as defined in the following claims.

What is claimed is:

1. A game system, comprising
a commercial game apparatus, operable to provide a first game for rearing a trained object and generating first information including result information regarding a training result of the trained object in the first game;
a network game apparatus, connected to a network and operable to provide a second game using the network and the trained object; and
a client device, connected to the network game apparatus via the network to play the second game, wherein:
the commercial game apparatus comprises:
a storage, operable to store the first information; and
a supplier, operable to supply second information, which is at least
a part of the first information and is to be recorded in a carriable medium; and the network game apparatus comprises:
a receiver, operable to receive the second information from the carriable medium via the client device;
a reproducer, operable to reproduce the result information based on the second information received by the receiver; and
an executer, operable to execute the second game based on the result information reproduced by the reproducer.

2. The game system as set forth in claim 1, wherein:
the commercial game apparatus is connected to the network game apparatus via the network;
the reproducer acquires the result information from the storage based on the second information received by the receiver.

3. A commercial game apparatus, comprising:
a provider, operable to provide a first game for rearing a trained object;
a storage, operable to store first information including result information regarding a training result of the trained object in the first game; and
a supplier, operable to supply second information, which is at least a part of the first information and is to be recorded on a carriable medium and used in a second game using the trained object, which is provided by a network game apparatus connected to a network and executed by a client device connected to the network game apparatus via the network.

4. The commercial game apparatus as set forth in claim 3, wherein the second information includes an identifier which identifies the result information in the storage.

5. The commercial game apparatus as set forth in claim 3, wherein the second information includes the result information.

6. The commercial game apparatus as set forth in claim 3, wherein the result information indicates a best condition of the trained object during the first game.

7. The commercial game apparatus as set forth in claim 3, wherein the second information is a password in which at least the result information has been encoded.

8. The commercial game apparatus as set forth in claim 7, wherein the password includes a check code which indicates whether the second information is authentic.

9. the commercial game apparatus as set forth in claim 3, wherein the second information includes an identifier which identifies the commercial game apparatus from which the second information is supplied.

10. The commercial game apparatus as set forth in claim 3, wherein the second information includes date information which indicates a date that the second information is supplied.

11. The commercial game apparatus as set forth in claim 10, wherein the second information includes serial number information which indicates an order of the second information supplied at the date indicated by the date information.

12. The commercial game apparatus as set forth in claim 3, wherein the second information includes serial number information which indicates an order of the second information supplied.

13. The commercial game apparatus as set forth in claim 3, wherein the result information includes a result gained by the trained object during the first game.

14. A network game apparatus connected to a client device via a network, which constitutes a game system together with a commercial game apparatus operable to provide a first game for rearing a trained object and to store first information including result information regarding a training result of the trained object in the first game, the network game apparatus comprising:
- a provider, operable to provide a second game using the network and the trained object;
- a receiver, operable to receive second information, which is at least a part of the first information, from a carriable medium via the client device in which the second information has been recorded;
- a reproducer, operable to reproduce the result information based on the second information received by the receiver; and
- an executer, operable to execute the second game based on the result information reproduced by the reproducer.

15. The network game apparatus as set forth in claim 14, wherein: the commercial game apparatus is connected to the network game apparatus via the network;
- the second information includes an identifier which identifies the result information stored in the commercial game apparatus; and
- the reproducer acquires the result information from the commercial game apparatus based on the identifier.

16. The network game apparatus as set forth in claim 14, wherein the second information includes the result information.

17. The network game apparatus as set forth in claim 14, wherein the result information indicates a best condition of the trained object during the first game.

18. The network game apparatus as set forth in claim 14, wherein:
- the second information is a password in which at least the result information has been encoded; and
- the reproducer decodes the password to reproduce the result information.

19. The network game apparatus as set forth in claim 14, wherein:
- the password includes a check code which indicates whether the second information is authentic; and
- the reproducer inspects the check code to determine whether the second information is authentic.

20. The network game apparatus as set forth in claim 14, further comprising an authorizer, operable to authorize a player to participate the second game in a case where the second information satisfies a predetermined requirement.

21. The network game apparatus as set forth in claim 20, wherein:
- the second information includes date information which indicates a date that the second information is supplied;
- the predetermined requirement is that the date information indicates a predetermined date.

22. The network game apparatus as set forth in claim 20, wherein:
- the second information includes serial number information which indicates an order of the second information supplied; and
- the predetermined requirement is that the serial number information indicates that a predetermined order.

23. The network game apparatus as set forth in claim 14, wherein:
- the second information includes an identifier which identifies the commercial game apparatus from which the second information is supplied; and
- the predetermined requirement is that the identifier indicates that the second information is supplied from a predetermined commercial game apparatus.

24. The network game apparatus as set forth in claim 20, wherein the predetermined requirement is that the second information indicates that the player is not identical with a player who has been playing the second game.

25. The network game apparatus as set forth in claim 20, wherein the predetermined requirement is that the second information indicates that the player is not identical with a player who has been playing the first game.

26. The network game apparatus as set forth in claim 14, wherein:
- the result information includes a result gained by the trained object during the first game; and
- the executor utilizes the result in the second game.

27. The network game apparatus as set forth in claim 26, wherein:
- the second game includes a game for training a new trained object; and
- the executer establishes an initial condition of the new trained object based on the result.

28. The network game apparatus as set forth in claim 14, further comprising a privilege provider, operable to provide a privilege to the client device in a case where the trained object satisfies a predetermined requirement in the second game.

29. A client device, constituting a game system together with a commercial game apparatus operable to provide a first game for rearing a trained object, and a network game apparatus connected to the client device via a network and operable to provide a second game using the network and the trained object, the client device comprising:
- a supplier, operable to supply, to the network game apparatus, second information which is at least a part of the first information and has been recorded in a carriable medium; and
- an executer, operable to execute the second game based on the second information.

30. A computer-readable recording medium, having recorded a program causing a computer in a commercial game apparatus to execute steps of:
- providing a first game for rearing a trained object;
- storing first information including result information regarding a training result of the trained object in the first game; and
- supplying, second information which is at least a part of the first information and is to be recorded in a carriable medium and used in a second game using the trained object, which is provided by a network game apparatus connected to a network and executed by a client device connected to the network game apparatus via the network.

31. A computer-readable recording medium, having recorded a program causing a computer in a network game apparatus connected to a network, which constitutes a game system together with a commercial game apparatus operable to provide a first game for rearing a trained object and to store first information including result information regarding a training result of the trained object in the first game, to execute steps of:
- providing a second game using the network and the trained object;
- receiving second information, which is at least a part of the first information and has been recorded in a carriable medium, from a client device connected to the network game apparatus via the network;

reproducing the result information based on the received second information; and executing the second game based on the reproduced result information.

32. A computer-readable recording medium, having recorded a program causing a computer in a client device, which constitutes a game system together with a commercial game apparatus operable to provide a first game for rearing a trained object, and a network game apparatus connected to the client device via a network and operable to provide a second game using the network and the trained object, to execute steps of:

supplying second information to the network game apparatus, which is at least a part of the first information and has been recorded in a carriable medium; and executing the second game based on the second information.

* * * * *